(12) United States Patent
Bonzi

(10) Patent No.: US 7,987,568 B2
(45) Date of Patent: Aug. 2, 2011

(54) APPARATUS FOR THE PRODUCTION OF CAPS

(75) Inventor: Ivan Bonzi, Imola (IT)

(73) Assignee: Sacmi Cooperativa Meccanici Imola Societa' Cooperativa, Imola (BO) (IT)

( * ) Notice: Subject to any disclaimer, the term of this patent is extended or adjusted under 35 U.S.C. 154(b) by 1443 days.

(21) Appl. No.: 10/560,904

(22) PCT Filed: Jun. 18, 2004

(86) PCT No.: PCT/IB2004/001917
§ 371 (c)(1),
(2), (4) Date: Mar. 6, 2006

(87) PCT Pub. No.: WO2004/110711
PCT Pub. Date: Dec. 23, 2004

(65) Prior Publication Data
US 2007/0092590 A1    Apr. 26, 2007

(30) Foreign Application Priority Data

Jun. 19, 2003  (IT) .............................. MO2003A0177

(51) Int. Cl.
*B23P 23/00* (2006.01)
*B23B 5/14* (2006.01)
*B23B 29/04* (2006.01)

(52) U.S. Cl. ......... 29/33 A; 29/564.7; 29/38 R; 82/70.1; 82/78; 82/99.1; 82/100; 82/101; 82/158; 83/881; 83/946

(58) Field of Classification Search .................... 83/946, 83/879, 881; 82/46, 70.1, 78, 99.1, 100, 82/101, 158, 160; 407/76, 88, 92; 29/564, 29/564.1, 564.7, 38 R, 33 A See application file for complete search history.

(56) References Cited

U.S. PATENT DOCUMENTS

| 3,492,709 | A | * | 2/1970 | Lebarre | ............................. 407/6 |
| 3,762,247 | A | * | 10/1973 | Sherwood et al. | ................. 82/12 |
| 4,013,496 | A |   | 3/1977 | Amberg et al. | |
| 4,553,461 | A |   | 11/1985 | Belongia | |
| 5,488,888 | A | * | 2/1996 | Kowal | ............................. 83/880 |

(Continued)

FOREIGN PATENT DOCUMENTS

EP       1 243 520 A       9/2002

(Continued)

OTHER PUBLICATIONS

English Abstract from the Derwent database for EP 1243520, which EP' 520 was published in Sep. 2002.*

(Continued)

*Primary Examiner* — Erica E Cadugan
(74) *Attorney, Agent, or Firm* — Nixon & Vanderhye P.C.

(57) ABSTRACT

An apparatus for the production of caps comprises a first operating turntable device associated with a first operating arrangement and a further operating turntable device associated with a further operating arrangement, between said first operating turntable device and said further operating turntable device a transferring turntable device being interposed such as to transfer said caps between said first operating turntable device and said further operating turntable device; a device for positioning a tool in relation to an object to be processed comprises a toolholder element suitable for bearing said tool, an adjustable member operationally associatable with said toolholder element and an abutting member suitable for pressing said toolholder element against said adjustable member.

8 Claims, 19 Drawing Sheets

U.S. PATENT DOCUMENTS

| | | | |
|---|---|---|---|
| 5,809,860 A * | 9/1998 | Haaser | 83/880 |
| 5,916,342 A * | 6/1999 | Ingram | 82/46 |
| 6,155,151 A | 12/2000 | Reichert | |
| 6,155,753 A * | 12/2000 | Chang | 407/92 |
| 7,673,543 B2 * | 3/2010 | Albonetti | 82/101 |

FOREIGN PATENT DOCUMENTS

| | | |
|---|---|---|
| FR | 1 128 678 A | 1/1957 |
| FR | 2 146 043 A | 2/1973 |

OTHER PUBLICATIONS

Degarmo et al., "Materials and Processes in Manufacturing", 1984, Macmillan Publishing Company, XP002297815, p. 549.*

Machine translation of FR 1128678, which FR '678 was published in Jan. 1957.*

Italian Patent Application MO2003 A 000177, filed Jun. 19, 2003.*

International Search Report of PCT/IB2004/001917, mailed Feb. 2, 2005.

* cited by examiner

APPARATUS FOR THE PRODUCTION OF CAPS

This invention relates to an apparatus for the production of caps, for example associatable with containers such as bottles for drinks, containers for detergents and receptacles in general.

Caps are known that are associated with different types of container.

Such caps can be obtained by forming through compression or through injection moulding.

The caps disclosed above are provided with a seal ring which, when the caps are first opened, remains attached to a container in such a way as to clearly show to a user whether the container has already been opened.

In order that the seal ring may be easily separable from the cap, the zone interposed between the seal ring and the cap is provided with a nominal indented cutting line.

The seal ring is provided with fixing promoting devices, for example having the form of flaps, suitable for interacting with a stop element obtained at a delivery port of the container and suitable for preventing the detachment of the seal ring from the container during the first opening of the latter.

Apparatuses for the manufacture of caps are known that are arranged to receive on operating rotating elements a cap obtained by compression forming or by injection moulding and comprising a bottom wall, a side wall that defines a side mantle of the cap, a seal ring and fixing promoting devices, such fixing promoting devices comprising appendages that are projected from the side wall in a direction opposite the bottom wall.

Such apparatuses comprise a first turntable with which a folding unit is associated arranged to fold the aforementioned appendages towards the inside of the caps, namely in the direction of the aforementioned base wall.

The apparatuses furthermore comprise a second turntable with which a cutting unit is associated that is arranged to make an incision on the aforementioned side wall in such a way as to define a nominal cutting line interposed between the seal ring and the mantle of the cap.

Alternatively, the cutting unit can be associated with a first turntable and the folding units can be associated with a second turntable.

The cutting unit comprises an etching knife, arranged outside the cap, against which the aforementioned side wall is made to rotate by means of a suitable cap moving unit.

The etching knife comprises a blade shaped in such a way as to have a series of teeth to make incisions in the side wall of the cap that pass through the side wall, between which zones without incisions are interposed, which constitute bridge elements suitable for being broken when the cap is first opened.

Alternatively, the etching knife may comprise a blade with a continuous cut that is suitable for interacting with caps that have a side wall with a variable thickness.

In this case, the through incisions are made in the zones of the side wall that have less thickness, whilst the bridge elements are defined at the zones of the side wall that have greater thickness.

The apparatuses disclosed above furthermore comprise a transport device interposed between the first turntable and the second turntable and suitable for picking up from the first turntable caps provided with already folded flaps to transfer them to the second turntable.

The transport device comprises a conveyor along which the caps are advanced in a substantially straight direction.

One drawback connected with the use of the transport device disclosed above consists of the fact that it implies a transient, in which a cap that comes from a rotational movement—given by the first turntable—takes on straight movement, and a further transient, in which the straight movement of the cap associated with the conveyor is transformed into a rotational movement at the moment of transfer onto the second turntable.

On the first turntable and on the second turntable the caps are received in respective seats that are separated from one another by an angle of a preset degree.

This means that on the first turntable and on the second turntable, the caps are distanced from one another and the movement of each of them is synchronized with the movement of the remaining caps.

On the other hand, in the conveyor the caps substantially move behind one another without the movement of each one of them being in phase with the movement of the others.

At an input region of the second turntable it is therefore necessary to distance the caps from one another to enable the latter to be correctly loaded onto the second turntable.

For this purpose, conveyors must be provided having a length that is such as to enable the caps to be distanced from one another and to synchronize the movements of the latter.

The known apparatuses comprise conveyors having lengths up to about three meters.

As a result, the apparatuses disclosed above have to be necessarily assembled in very spacious environments and do not allow optimum use of the spaces of a building inside which they have to be installed.

European patent application EP-A-1243520 discloses an apparatus for the production of caps comprising a sole operating turntable with which both a folding unit and a cutting unit are associated.

The apparatus furthermore comprises a first transfer turntable suitable for supplying the operating turntable and a second transfer turntable suitable for receiving the finished caps.

In this apparatus the folding unit and the cutting unit are arranged in positions that are angularly subsequent and one after the other they interact with the caps.

As the apparatus disclosed above is provided with a spindle that must be adapted both to the fold and to the cut, for certain types of caps such a spindle may not be able to satisfactorily perform both functions (folding and cutting).

The folding unit disclosed in EP-A-1243520 comprises a ring provided with a tapered end suitable for being inserted inside the caps.

A further drawback of the apparatus disclosed above consists of the fact that the aforementioned ring, being projectingly supported on corresponding support elements, tends to flex.

As a result, the caps, whilst they are associated with the operating turntable, must be subjected to a plurality of operations that are rather close in time, such operations being furthermore performed in zones of the apparatus that are at a small distance from one another.

In particular, in addition to the folding and cutting operations, there must be provided an operation of insertion of the caps inside the seats with which the operating turntable is provided, and an operation of pickup of the caps from the operating turntable.

As a result, further operations cannot be provided, connected for example to quality control and finishing, whilst the caps are associated with the operating turntable.

A further drawback of the apparatuses disclosed above consists of the fact that the blade of the etching knife with which the cutting unit is provided is subjected to significant wear.

It is therefore necessary to manually position the etching knife by moving its blade in the direction of the zone of contact with the caps, in such a way as to offset a shortening of the blade due to the aforementioned wear.

Manual positioning occurs by means of the use of a split nut, provided with a micrometric screw, that is coupled with a toolholder that supports the etching knife.

The aforementioned split nut is manually actuatable by means of a handwheel.

As a result, to carry out the adjustment of the position of the blade, it is necessary to stop the apparatus and perform complex adjusting operations in order not to subject the aforementioned micrometric screw to the loads that are exerted during cutting.

To discharge the screw from the aforementioned mechanical stress, a clamp lock of the etching knife may be provided, which however significantly increases the complexity of the apparatus, and the cost of thereof.

Apparatuses of the known type are equipped with a folding unit provided with punches that exert a pulse action on the fixing promoting unit in a substantially axial direction to the inside of the caps.

A further drawback of the known apparatuses therefore consists of the risk of determining on the caps plastic deformation that is often of an unacceptable amount.

One object of the invention is to improve the apparatuses for the production of caps.

A further object of the invention is to provide an apparatus for the production of caps that enables a plurality of operations to be performed on the aforementioned caps.

A further object of the invention is to obtain an apparatus for the production of caps from which the aforementioned caps can be evacuated according to any direction of advance.

A yet further object is to obtain an apparatus for the production of caps in which the cutting unit can be positioned with extreme precision and without necessarily interrupting the work cycle of the apparatus.

A yet further object of the invention is to obtain an apparatus for the production of caps provided with a device for positioning the cutting unit that, during operation, is substantially not subjected to mechanical stress.

A yet further object of the invention is to obtain an apparatus for the production of caps provided with a folding unit shaped in such a way as not to cause plastic deformations of the caps.

In a first aspect of the invention, an apparatus is provided for the production of caps, comprising a first operating turntable device associated with a first operating arrangement and a further operating turntable device associated with a further operating arrangement, wherein between said first operating turntable device and said further operating turntable device there is interposed a transferring turntable device such as to translate said caps between said first operating turntable device and said further operating turntable device.

In one embodiment, the first operating arrangement comprises a folding arrangement, arranged to fold a fixing promoting arrangement with which said caps are provided, and the further operating arrangement comprises a cutting arrangement, arranged to make nominal cutting line means in a side wall of the caps.

In another embodiment, the first operating arrangement comprises a cutting arrangement, whereas the further operating arrangement comprises a folding arrangement. In a further embodiment, the apparatus furthermore comprises a further transferring turntable device such as to pick up the caps from the further operating turntable device.

Owing to this aspect of the invention it is possible to obtain an apparatus for the production of caps that is provided with limited overall dimensions inasmuch as the transferring turntable device is provided with rather a compact shape.

The presence of the transferring turntable device enables the installation of large conveyor device to be avoided between the first operating turntable device and the further operating turntable device.

As the rotation speed of the transferring turntable device is synchronized with that of the first operating turntable device and of the second operating turntable device it is possible to obtain an effective and simple movement of the caps.

Furthermore, owing to the presence of a further transferring turntable device, the caps can be evacuated from the apparatus according to any direction of advance.

Providing a rotating device specifically intended for unloading the caps from the apparatus in fact enables selecting the angular position of the further transferring turntable device at which to provide a pickup line.

As no further operation has to be performed whilst the caps are associated with the further transferring turntable device, the aforementioned pickup line can be arranged substantially in any position in relation to the second transferring turntable device.

This enables the apparatus to be positioned inside an environment in such a way as to optimize the space delimited by the aforementioned environment.

This is made possible by the fact that the apparatus can have an extent and a shape such as to adapt to any structural constraints present in the aforementioned environment.

In a second aspect of the invention, an apparatus is provided for the production of caps, comprising a first operating turntable device associated with a first operating arrangement and a further operating turntable device associated with a further operating arrangement, wherein between said first operating arrangement and said further operating arrangement a monitoring device is interposed arranged to monitor said caps. In one embodiment, the first operating arrangement comprises a folding arrangement arranged to fold a fixing promoting arrangement with which said caps are equipped, and said further operating arrangement comprises a cutting arrangement arranged to make a nominal cutting line in a side wall of said caps.

In one embodiment, the apparatus furthermore comprises, downstream of the monitoring device, a pickup arrangement arranged to pick up from the apparatus caps that have been deemed not to conform to a preset quality standard following an examination conducted by the aforementioned monitoring device.

In another embodiment, the monitoring device comprises cameras.

Owing to this aspect of the invention, defective caps can be rejected before being subjected to cutting operations.

This makes it possible to prevent caps from damaging the cutting arrangement.

In one embodiment, the monitoring device is associated with a transferring turntable device interposed between a first operating turntable device with which the folding arrangement is associated and a further operating turntable device with which the cutting arrangement is associated.

Providing the aforementioned transferring turntable device enables the apparatus according to the invention to be equipped with further operating devices—such as monitoring devices or the like—suitable for performing on the caps additional operations to the folding and cutting operations.

This enables a considerable advantage to be achieved compared with the prior art, inasmuch as such further operating devices are difficult to install on apparatuses made according to the teachings of EP-A-1243520.

In a third aspect of the invention a device is provided for positioning a tool in relation to an object to be processed, comprising a toolholder element suitable for bearing said tool and an adjustable member operationally associatable with said toolholder element, wherein an abutting member is furthermore comprised, said abutting member being suitable for tightening said toolholder element against said adjustable member.

In one embodiment, the adjustable member comprises a block actuated to slide by an adjusting arrangement and provided with a tilted face suitable for interacting with a correspondingly tilted active surface of the toolholder element.

In another embodiment, the abutting member comprises a further tilted face suitable for interacting with a further correspondingly tilted active surface opposite the aforementioned active surface of the toolholder element.

Owing to this aspect of the invention, it is possible to obtain a device for positioning a tool, provided with an adjusting arrangement arranged to move the adjustable member, which adjusting member is not substantially subjected to mechanical stress during operation of the apparatus.

In particular, it is possible to obtain an apparatus for the production of caps wherein the distance of the cutting arrangement from the caps to be cut can be adjusted to offset shortening due to cutting arrangement wear.

In a fourth aspect of the invention, an apparatus is provided for the production of caps comprising a chamber element isolated from an external environment and arranged to receive said caps to enable said caps to be subjected to controlled treatment.

In one embodiment, with the chamber element an adjusting arrangement is associated arranged to adjust the temperature inside the chamber element.

In another embodiment with the chamber element an irradiating arrangement is associated arranged to irradiate the caps.

In a further embodiment, with the chamber element a cleaning arrangement is associated arranged to perform cap cleaning operations.

In a yet further embodiment, the chamber element is associated with a turntable device arranged to transfer the caps.

Owing to this aspect of the invention, it is possible to obtain an apparatus in which the caps can be subjected to treatment in a controlled environment.

In a fifth aspect of the invention, an apparatus is provided for the production of caps, comprising a cutting arrangement arranged to make on said caps a nominal cutting line, wherein a sensing arrangement is furthermore comprised, said sensing arrangement being operationally associated with said cutting arrangement in such a way as to monitor the positioning of said cutting arrangement in relation to said caps.

In one embodiment, the sensing arrangement comprises a position sensing device arranged to detect thermal dilations of an etching knife of the cutting arrangement.

In another embodiment, the sensing arrangement comprises a temperature sensing device arranged to detect the temperature of said caps.

In a further embodiment, the sensing arrangement comprises a colour sensing device arranged to detect the colour of said caps.

In a sixth aspect of the invention, an apparatus is provided for the production of caps, comprising a folding arrangement arranged to fold a fixing promoting arrangement inside said caps, wherein said folding arrangement comprises an articulated folding device provided with an operating zone movable between an inactive position, in which said operating zone is positioned outside said caps, and a work position, in which said operating zone is received inside said caps in such a way as to fold said fixing promoting arrangement inside said caps.

Owing to this aspect of the invention, it is possible to obtain an apparatus for the production of caps in which the risks of damage to the caps during folding operations of the fixing promoting arrangement are noticeably limited or are even completely eliminated.

In a seventh aspect of the invention, an apparatus is provided for the production of caps, comprising a folding arrangement arranged to fold a fixing promoting arrangement with which said caps are provided and a cutting arrangement arranged to make a nominal cutting line in a side wall of said caps, wherein said cutting arrangement is coaxial to said folding arrangement and is arranged outside said folding arrangement.

The invention can be better understood and implemented with reference to the attached drawings that show a non-limiting embodiment by way of example, in which.

Figure 1:
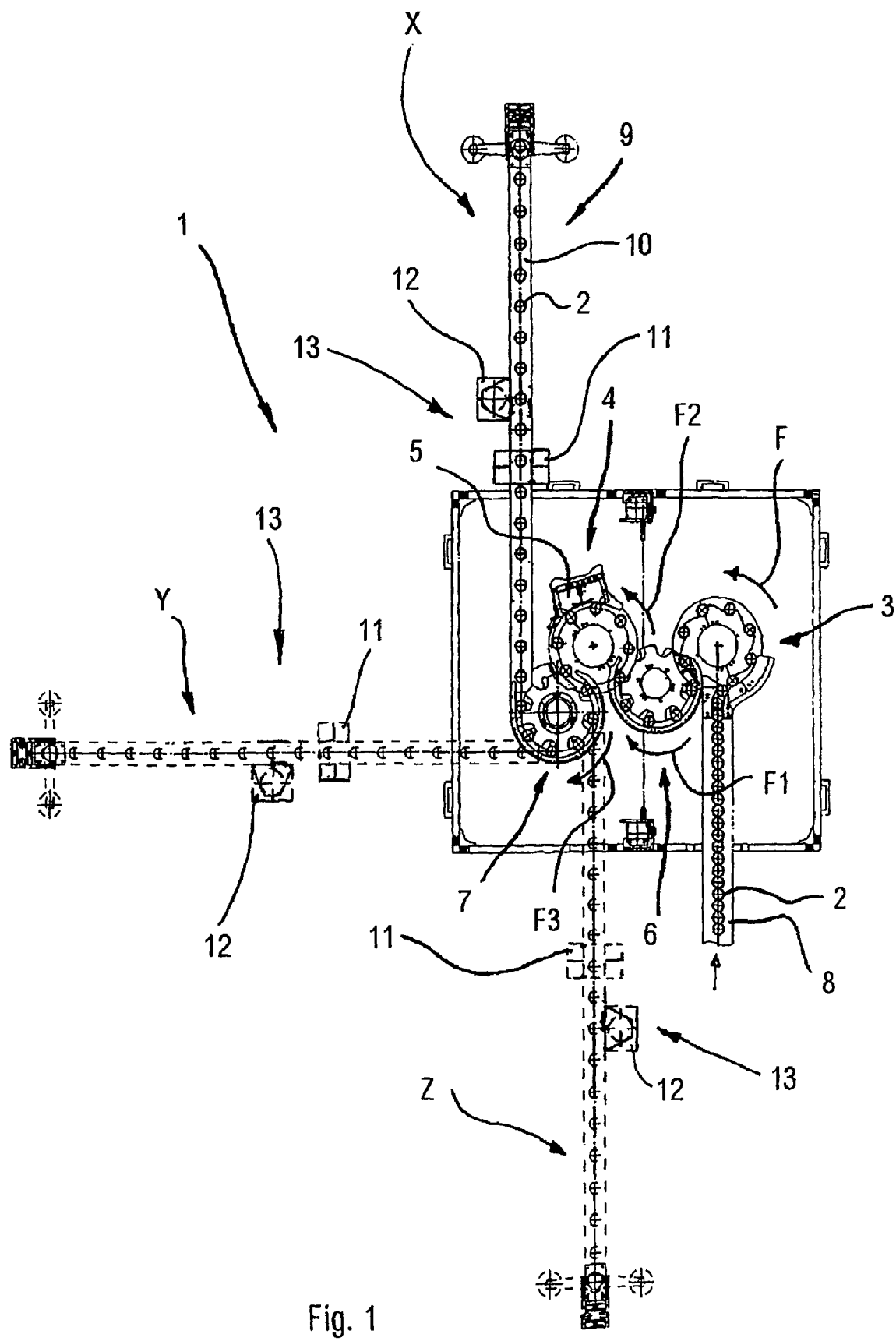
FIG. 1 is a plan view of an apparatus for the production of caps.
Figure 2:
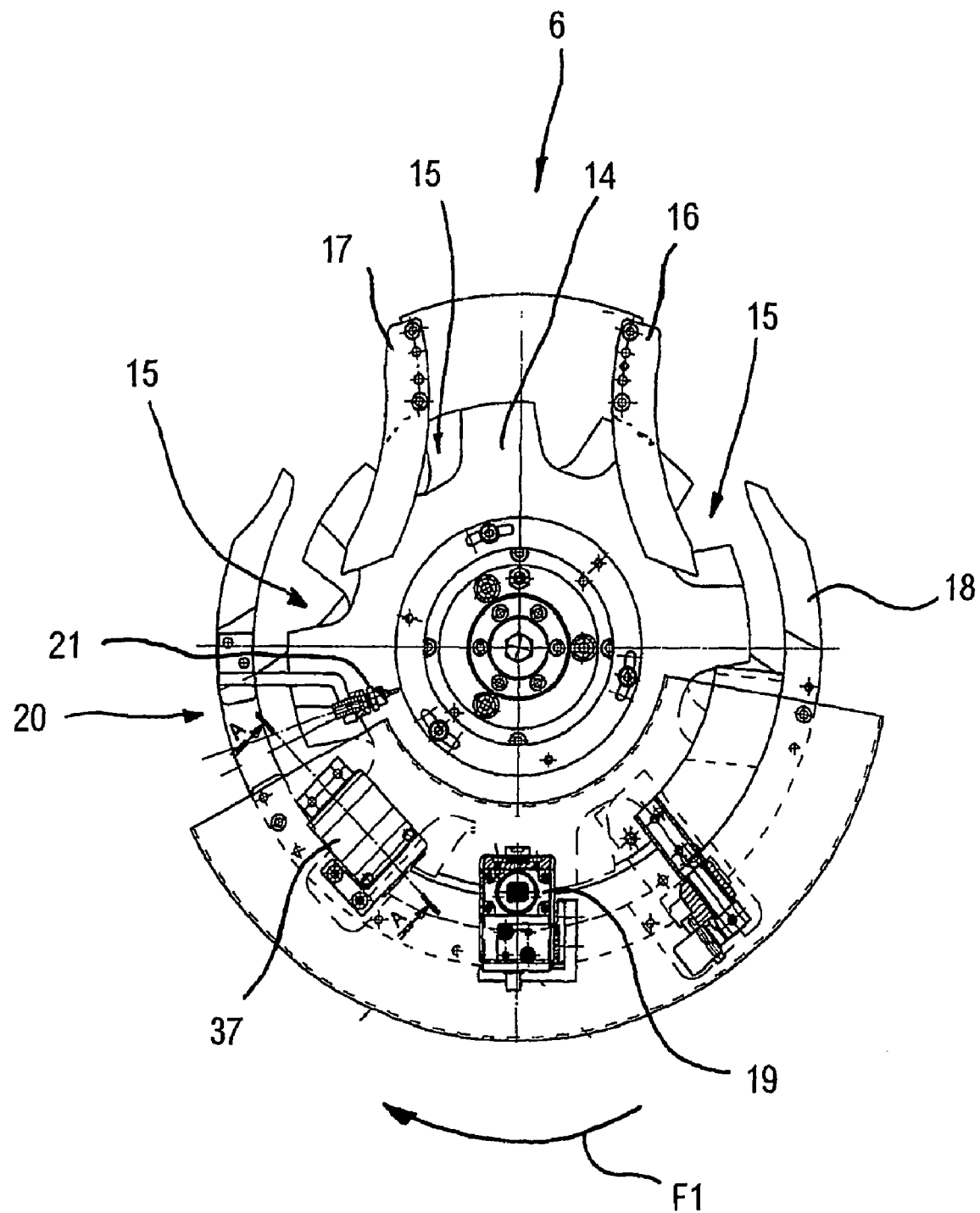
FIG. 2 is a plan view of a transferring turntable device of the apparatus in FIG. 1.

With reference to FIGS. 1 and 2, an apparatus 1 is shown for the production of caps 2 suitable for being associated with containers in general.

The caps 2 can be made by compression forming or by injection moulding, of a plastic material.

The caps 2 comprise a base wall suitable for closing an opening of the aforementioned containers and a side wall suitable for interacting with a neck of the containers.

In the side wall, a mantle can be identified, which may be internally provided with a thread suitable for engaging in a corresponding thread obtained in the aforementioned neck, with a seal ring that acts as an opening indicator element.

Between the mantle and the seal ring there is provided a nominal cutting line consisting of incisions passing through the side wall, interrupted by non-cut zones that constitute bridge elements suitable for being fractured in the course of the first opening of the caps 2.

Figure 18:
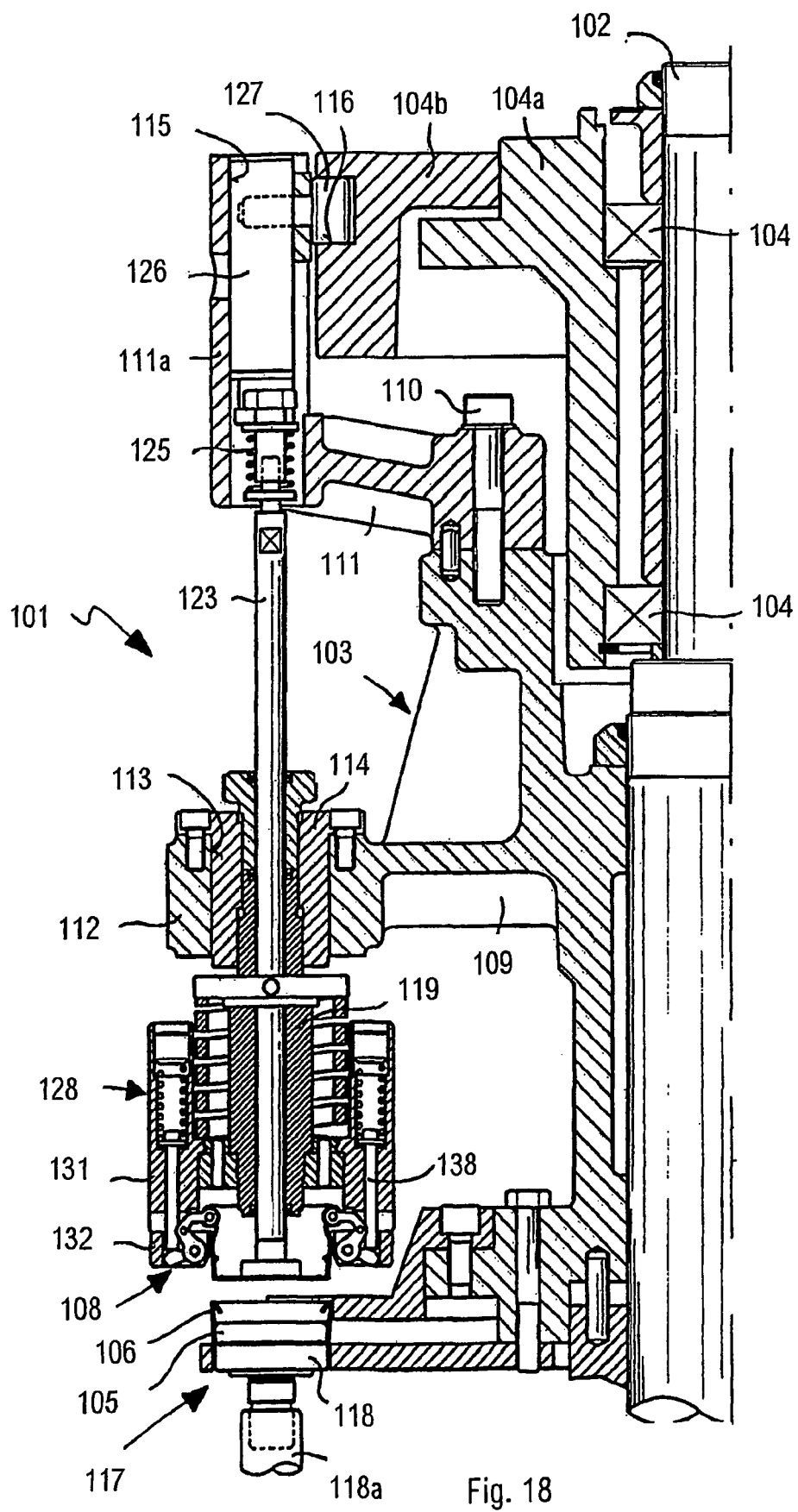
FIG. 18 is a partial section taken along a transverse plane of one embodiment of the apparatus for the production of caps according to the invention.
Figure 19:
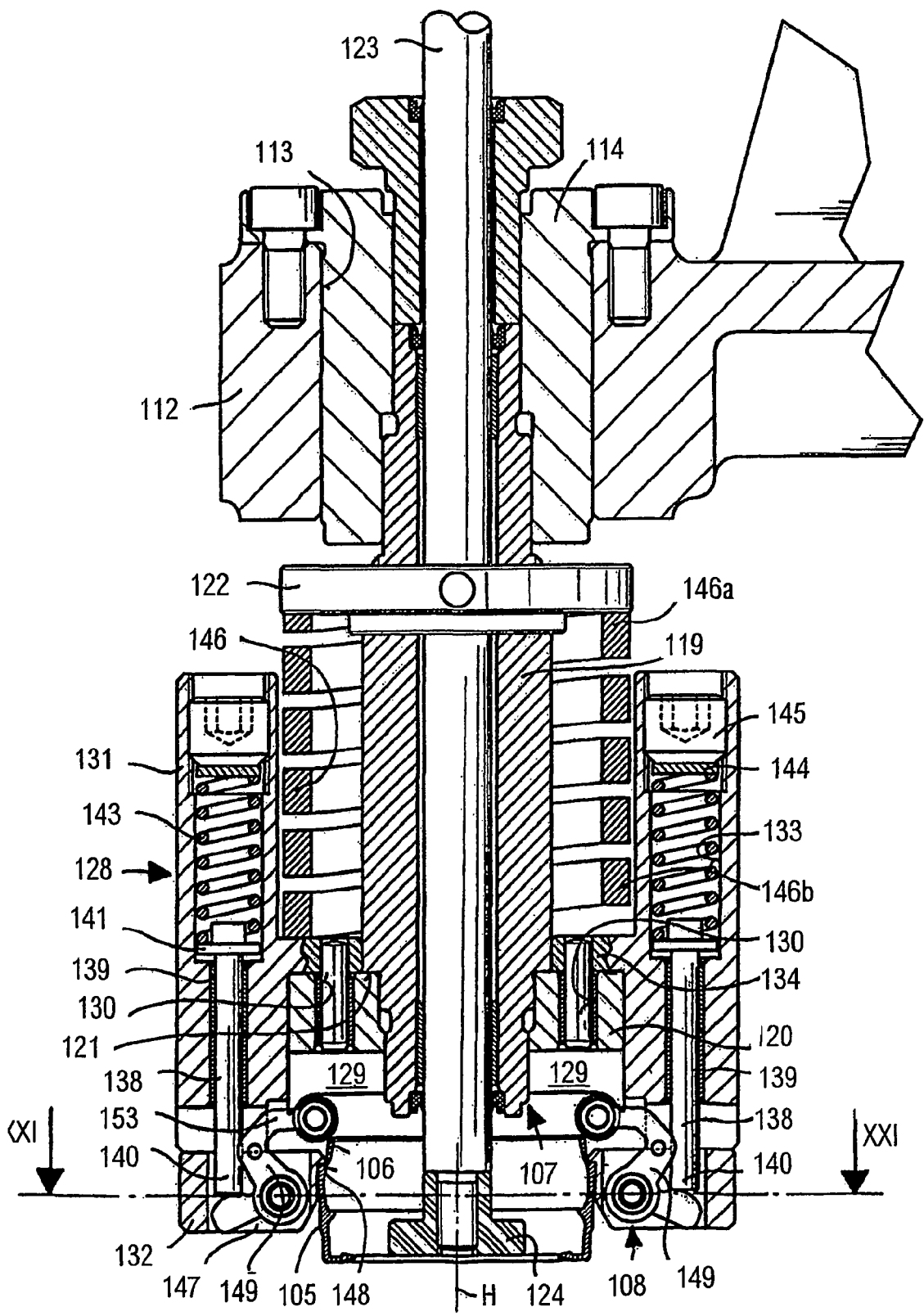
FIG. 19 is a partially sectioned front view showing the apparatus in FIG. 18 in a phase preceding execution of folding of the fixing promoting arrangement with which the caps are provided.
Figure 20:
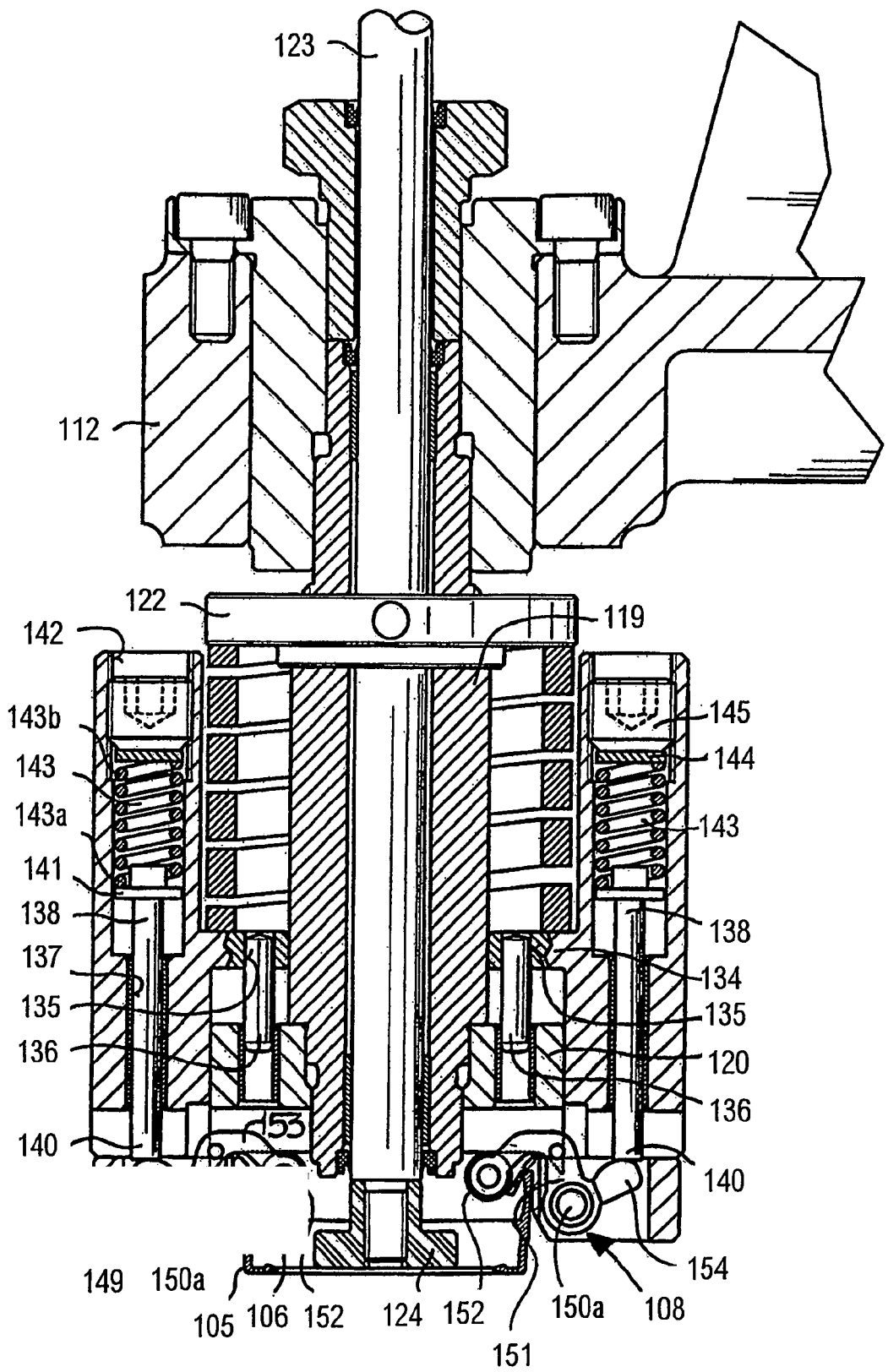
FIG. 20 is a partially sectioned front view of the apparatus in FIG. 18 showing a fixing promoting arrangement folded inside a cap.

With the seal ring a fixing promoting arrangement is connected suitable for preventing the seal ring from getting detached from the corresponding container during said first opening. The fixing promoting arrangement comprises a plurality of flaps 54 (FIG. 15), or of a continuous ring 106 (FIGS. 18 and 19), that interact with a stop obtained on the neck of the container.

The flaps 54, at the outlet of a mould in which the caps 2 have been formed, take on a first position in which they are turned towards the exterior of the caps 2, or are substantially parallel to the base wall of the caps 2.

In other words, the flaps 54, at the outlet of the mould, take on a position that is different from a further position they have to take on once they have been applied to the neck of a container.

Before the caps 2 have been associated with the corresponding containers, the flaps 54 are taken to the further position, in which they are turned towards the inside of the caps 2.

The apparatus 1 comprises a first operating turntable 3 with which is associated a folding arrangement 52 (FIG. 15) arranged to fold the flaps 54, transferring them from the aforementioned first position to the aforementioned further position.

The apparatus 1 comprises a conveying device 8 arranged for supplying the first operating turntable 3.

The conveying device 8 comprises a pneumatic conveyor inside which the caps 2 are advanced, substantially one in contact with the other, by means of pressurized air.

The apparatus 1 furthermore comprises a second operating turntable 4 with which is associated a cutting arrangement 5 arranged to make the nominal cutting line in the side wall of each of the caps 2.

The apparatus 1 is furthermore provided with a transferring turntable 6 interposed between the first operating turntable 3 and the second operating turntable 4 and suitable for transferring the caps 2 in the course of processing from the first operating turntable 3 to the second operating turntable 4.

The transferring turntable 6 enables an extremely compact apparatus to be obtained, inasmuch, unlike what happens in the known apparatuses of the prior art, no linear connection channels are provided interposed between the first operating turntable 3 and the second operating turntable 4.

The apparatus 1 is furthermore provided with a further transferring turntable 7, suitable for receiving the caps 2 from the second operating turntable 4 to deliver them to a further conveying device 9, comprising a driven conveyor belt 10, that advances them towards collecting devices.

The further transferring turntable 7 enables the caps 2 to be evacuated from the apparatus 1 in such a way that they advance on the conveyor belt 10, being separated from one another by a preset distance.

This enables auxiliary devices 13 to be provided, associated with the conveyor belt 10, suitable for conducting caps 2 monitoring, finishing or pickup operations.

The auxiliary devices 13 may for example comprise cameras 11 suitable for checking for the presence of any defects, or removing devices 12 arranged to reject caps 2 that have been found to be defective.

The presence of the further transferring turntable 7 enables the further conveying device 9 to be directed in any direction in relation to the apparatus 1.

As shown in FIG. 1, in fact the further conveying device 9 can be arranged in position X, indicated by a continuous line, or in the further positions Y, or Z, indicated with a broken line, or in any other position.

In this way, the production line of the caps 2 may overall have any direction in such a way as to optimize the exploitation of the space of environments inside which it is installed.

Providing a further transferring turntable 7 specifically dedicated to the evacuation of the caps 2 in fact enables the further conveying device 9 to be associated with any point of the latter.

In other words, the caps 2 may perform on the further transferring turntable 7 an angular shift of the desired amount, it being possible to select this amount for the purpose of positioning at will the point of connection of the further transferring turntable 7 with the further conveyor 9 and to direct the latter according to a desired direction.

This was not possible in the known apparatuses of the prior art which were not provided with an unloading turntable. In the aforementioned apparatuses in fact the unloading of the caps could occur only after overcoming a minimum value of the angular stroke of the operating turntable, this value being determined by the number and type of the operations that have to be conducted whilst the caps are on the aforementioned operating turntable.

In the aforementioned apparatuses, the above operations require a rotation corresponding to an angle of about 300°, and as a result the unloading of the finished caps 2 must occur in the course of a further rotation corresponding to an angle degree limited to only 60° approximately.

In order to better understand the operation of the apparatus 1, in FIG. 1, the arrow F shows the direction of rotation of the first operating turntable 3, the arrow F1 shows the direction of rotation of the transferring turntable 6, the arrow F2 shows the direction of rotation of the second operating turntable 4 and the arrow F3 shows the direction of rotation of the further transferring turntable 7.

With reference to FIG. 2, the transferring turntable 6 comprises a rotating table 14 provided with seats 15 angularly distanced from one another and suitable for each receiving a cap 2.

The transferring turntable 6 furthermore comprises an inlet guide 16, suitable for promoting the insertion of the caps 2 inside the seats 15, and an outlet guide 17 suitable for promoting the evacuation of the caps 2 from the rotating table 14.

The transferring turntable 6 furthermore comprises an intermediate guide 18 that cooperates with the seats 15 to keep the caps 2 in the correct position during actuation of the rotating table 14.

With the transferring turntable 6 a camera 19 is associated that is suitable for monitoring the caps 2 that are conveyed from the rotating table 14 in order to identify any faults in the latter.

An expulsion device 20 can also be provided comprising an element generating a jet of pressurized air 21 arranged to reject the caps 2 that have been recognized as defective by the camera 19.

With the transferring turntable 6 a cutting device 37 is furthermore associated that is suitable for removing from an external zone of the bottom wall of the caps 2 appendages of the casting feedhead, in the case of caps 2 obtained by injection moulding.

As the aforementioned nominal cutting line is obtained by making the caps 2 roll on the cutting arrangement 5, the aforementioned appendages may constitute unevenness that hinder correct rolling.

As a result, if the appendages are not removed, the nominal cutting line can define an elliptic length rather than a circumference and the cap 2 on which it has been made must therefore be rejected.

The first operating turntable 3, the second operating turntable 4, the transferring turntable 6 and the further transferring turntable 7 may have diameters that are different from one another and as a result on each of them a different number of seats 15 may be obtained.

Figure 3:
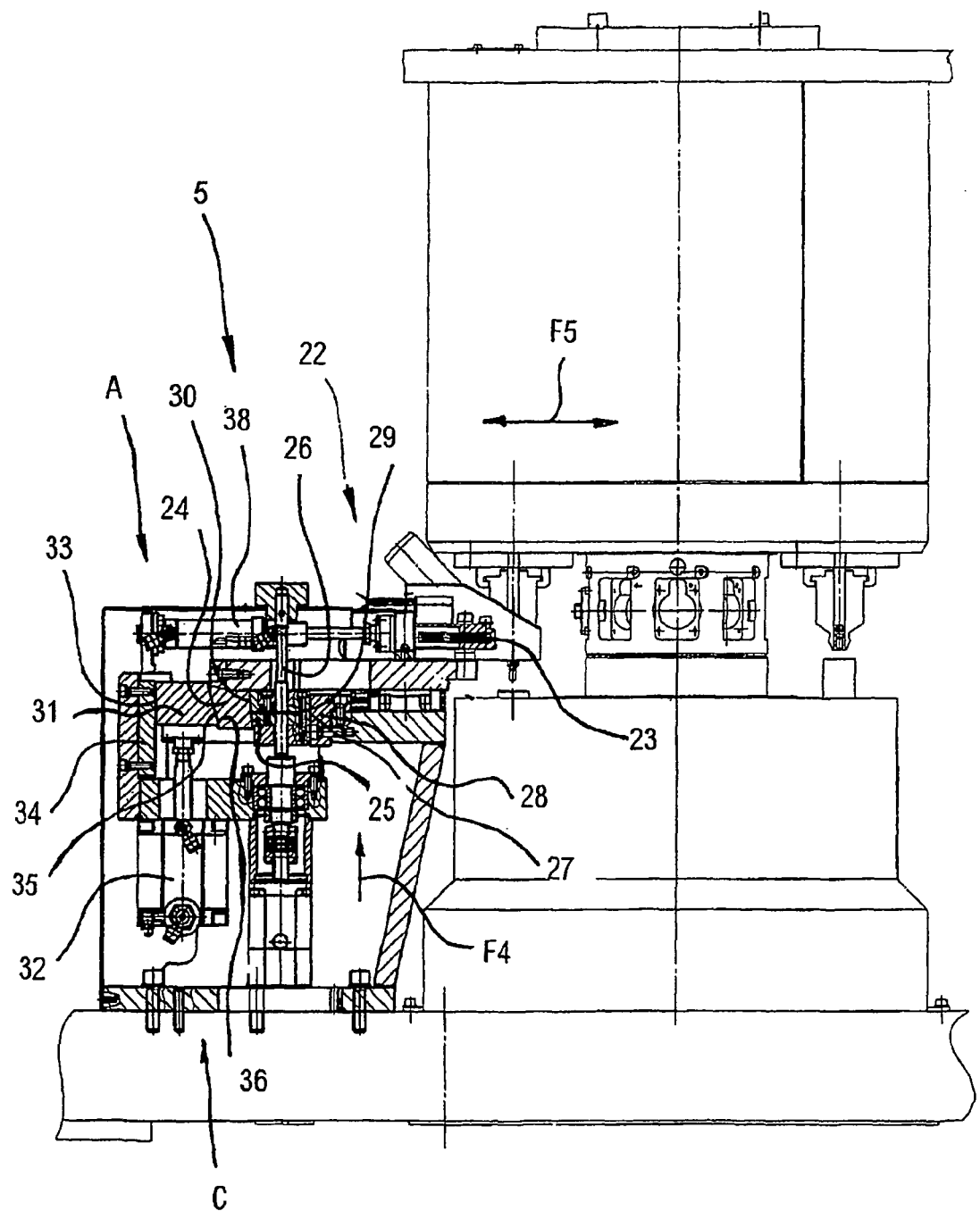
FIG. 3 is a partially sectioned side view of an operating turntable device of the apparatus in FIG. 1 with which a cutting arrangement is associated, shown in an operating configuration, and a positioning arrangement of the aforementioned cutting arrangement.
Figure 4:
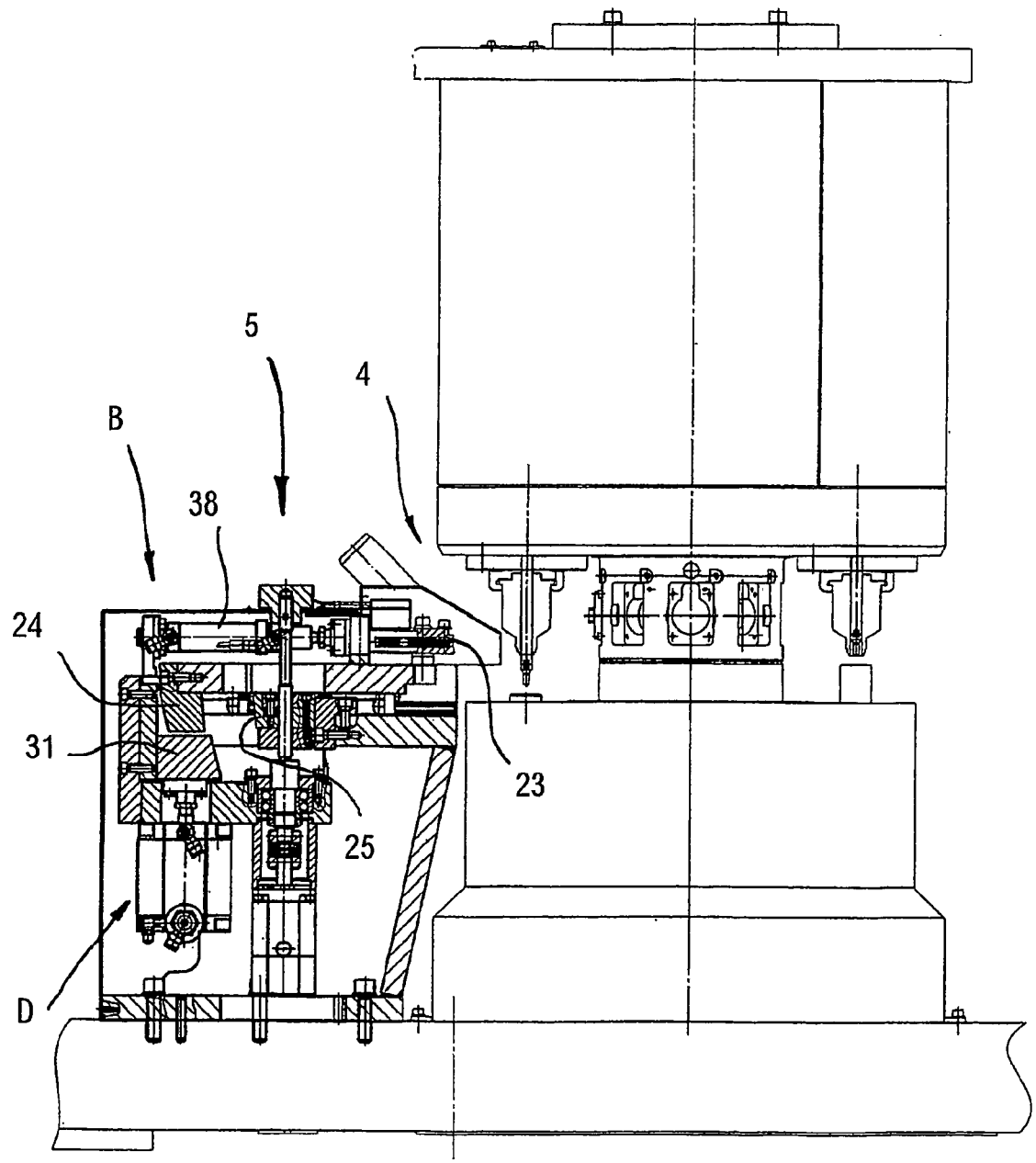
FIG. 4 is a view like the one in FIG. 3, showing the cutting arrangement in a rest configuration.

With reference to FIGS. 3 and 4 there is shown a cutting arrangement 5 comprising a positioning device 22 suitable for positioning an etching knife 23 in relation to a cap 2 to be cut.

The positioning device 22 comprises a toolholder block 24 arranged to support the etching knife 23, the toolholder block 24 being slidable on a frame of the apparatus 1 in the direction indicated by the arrow F5.

The positioning device 22 furthermore comprises an adjustable member 25 that can be translated by means of a micrometric screw 26 in a direction that is substantially vertical.

The adjustable member 25 comprises a first face 27 arranged substantially vertically and suitable for sliding keeping in contact with a bar 28 that is integral with the frame of the apparatus 1.

The adjustable member 25 furthermore comprises a second face opposite the first face 27 and tilted in relation to a vertical plane.

The second face 29 is suitable for interacting with an active surface 30, correspondingly tilted in relation to a vertical plane, of the toolholder block 24.

The apparatus 1 furthermore comprises an abutting member 31 cooperating with the toolholder block 24 and with the adjustable member 25.

The positioning device 22 furthermore comprises an actuator 32 arranged to transfer the abutting member 31 between a raised work position, indicated by C in FIG. 3, and a lowered rest position, indicated by D in FIG. 4.

The abutting member 31 comprises a yet further first face 33 arranged substantially vertically and suitable for sliding, keeping in contact with a plate 34 connected to the frame of the apparatus 1, when the abutting member 31 is transferred from the lowered rest position D to the raised work position C, and vice versa.

The abutting member 31 furthermore comprises a further second face 35 opposite the further first face 33 and tilted in relation to a vertical plane.

The yet further second face 35 is suitable for interacting with a further active surface 36, correspondingly tilted in relation to the vertical, of the toolholder block 24.

The active surface 30 and the further active surface 36 are obtained on opposite sides of the toolholder block 24, the tilt in relation to a vertical plane of the active surface 30 being less than the tilt in relation to a vertical plane of the further active surface 36.

Adjustment of the position of the etching knife 23 occurs in the manner described below.

By acting on the micrometric screw 26 it is possible to position the adjustable member 25.

Subsequently, the toolholder block 24 is made to slide in the direction of the arrow F5 until the active surface 30 comes to abut on the second face 29 of the adjustable member 25.

Also subsequently, the actuator 32 makes the abutting member 31 interact with the toolholder block 24 in such a way as to press the further second face 35 into contact with the further active surface 36.

In this way, the positioning device 22 is kept in an operating configuration, indicated by A in FIG. 3, in which the stress to which the etching knife 23 is subjected is transmitted only to the adjustable member 25 and to the abutting member 31 and from the latter to the frame of the apparatus 1.

In other words, during operation of the apparatus 1, the micrometric screw 26 is not subjected to mechanical stress that could damage it or even cause its structural failure.

The etching knife 23, if it is worn, can be approached to the caps 2 to be cut in such a way as to offset the shortening due to the aforementioned wear.

The approach initially occurs by translating the adjustable member 25 in the direction indicated by the arrow F4.

Subsequently, also the abutting member 31 is transferred in the direction of the arrow F4.

The interaction between the further second face 35 and the further tilted surface 36 causes a shift of the toolholder block 24, in the direction of the arrow F5, approaching a cap 2 that has to be cut.

The aforementioned shift of the toolholder block 24 continues until the active surface 30 abuts on the second face 29.

In other words, the tilt of the active surface 30 and of the further active surface 36 enable a correspondence between the size of the shift of the adjustable member 25 in the direction of the arrow F4 and the size of the shift of the toolholder block 24 in the direction of the arrow F5 to be established.

The positioning device 22 furthermore comprises a further actuator 38 arranged to move the toolholder block 24, when the abutting member 31 is in the lowered rest position D.

By actuating the further actuator 38 it is possible to transfer the device 22 from the operating configuration A to a rest configuration, indicated by B in FIG. 4, in which the cutting arrangement 5 is removed from the second operating turntable 4 in such a way as to enable maintenance operations such as monitoring, or replacement of the etching knife 23.

Figure 5:
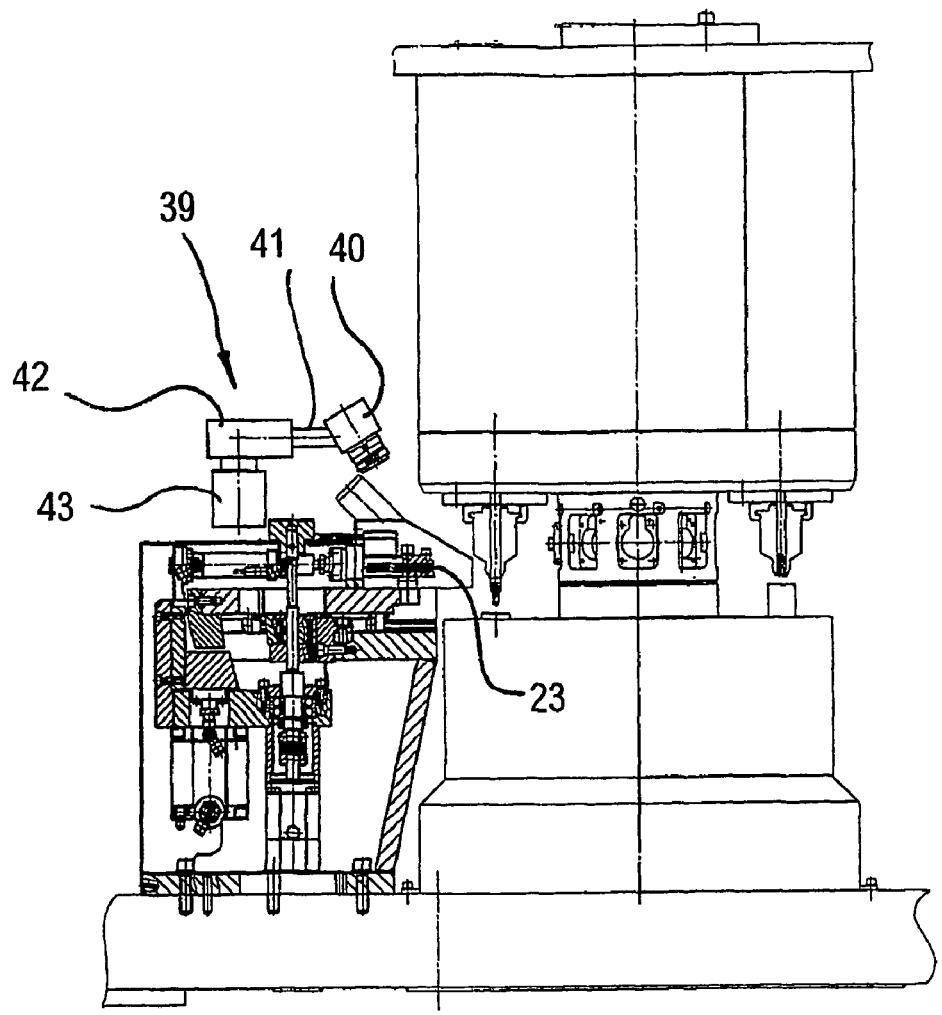
FIG. 5 is a view like the one in FIG. 3, showing a monitoring device associated with the cutting arrangement.
Figure 6:
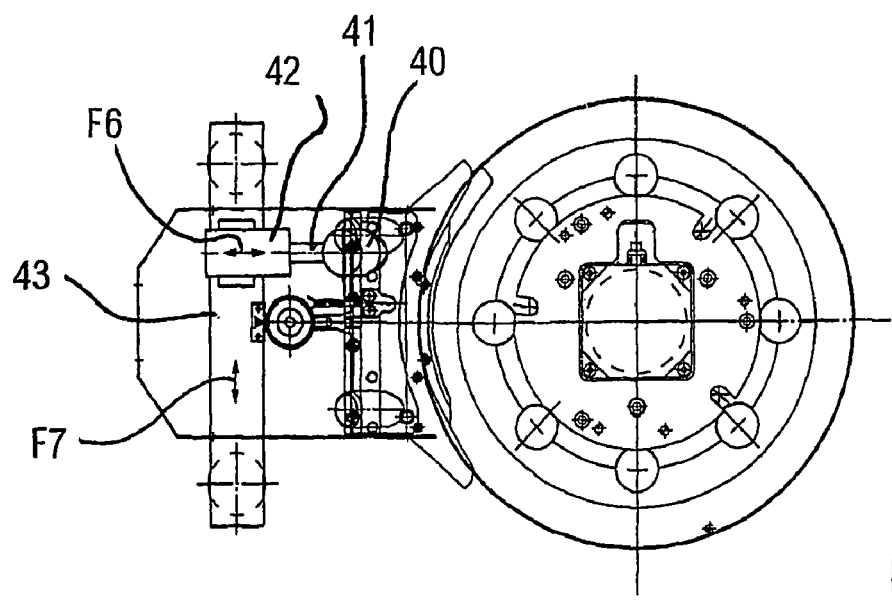
FIG. 6 is a plan view of the apparatus in FIG. 5.

As shown in FIGS. 5 and 6, a monitoring device 39 of the etching knife 24 can be provided suitable for checking the state of wear of the etching knife 23, when the positioning device 22 is in the rest configuration B.

The monitoring device 39 comprises a further camera 40 supported by an arm 41 movable in the direction indicated by the arrow F6 in relation to a carriage 42 to which the arm 41 is slidingly coupled.

The monitoring device 39 furthermore comprises a guide element on which the carriage 42 can slide in the direction indicated by the arrow F7.

The further actuator 38 furthermore enables the cutting phase to be eliminated in an extremely simple and rapid manner—without having to stop the operation of the apparatus 1—in processing cycles performed on caps 2 in which the obtaining of the nominal cutting line is not provided for.

Figure 7:
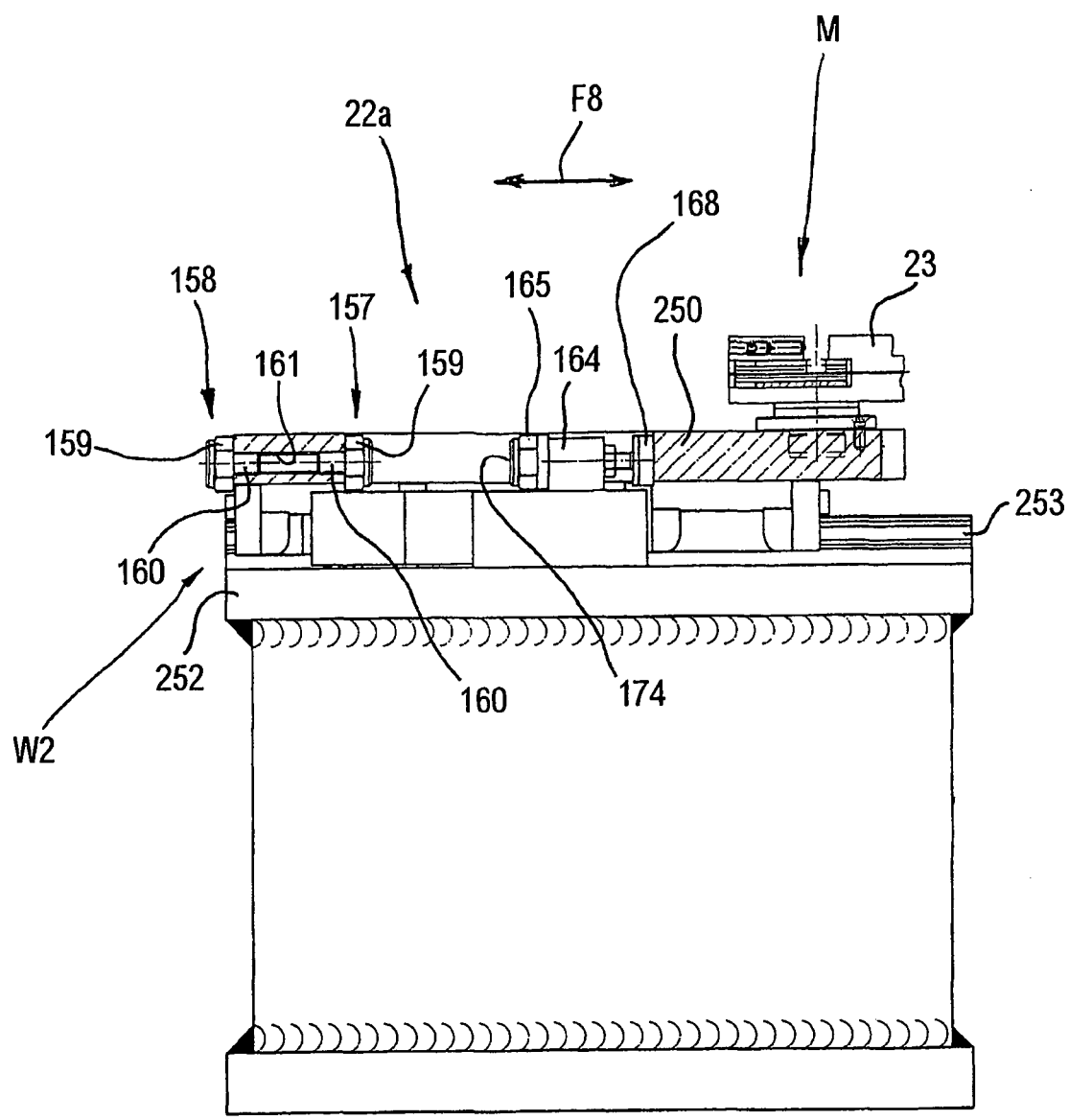
FIG. 7 is a view like the one in FIG. 3 showing the cutting arrangement, shown in a rest configuration, and a positioning arrangement of the cutting arrangement made according to one version.
Figure 8:
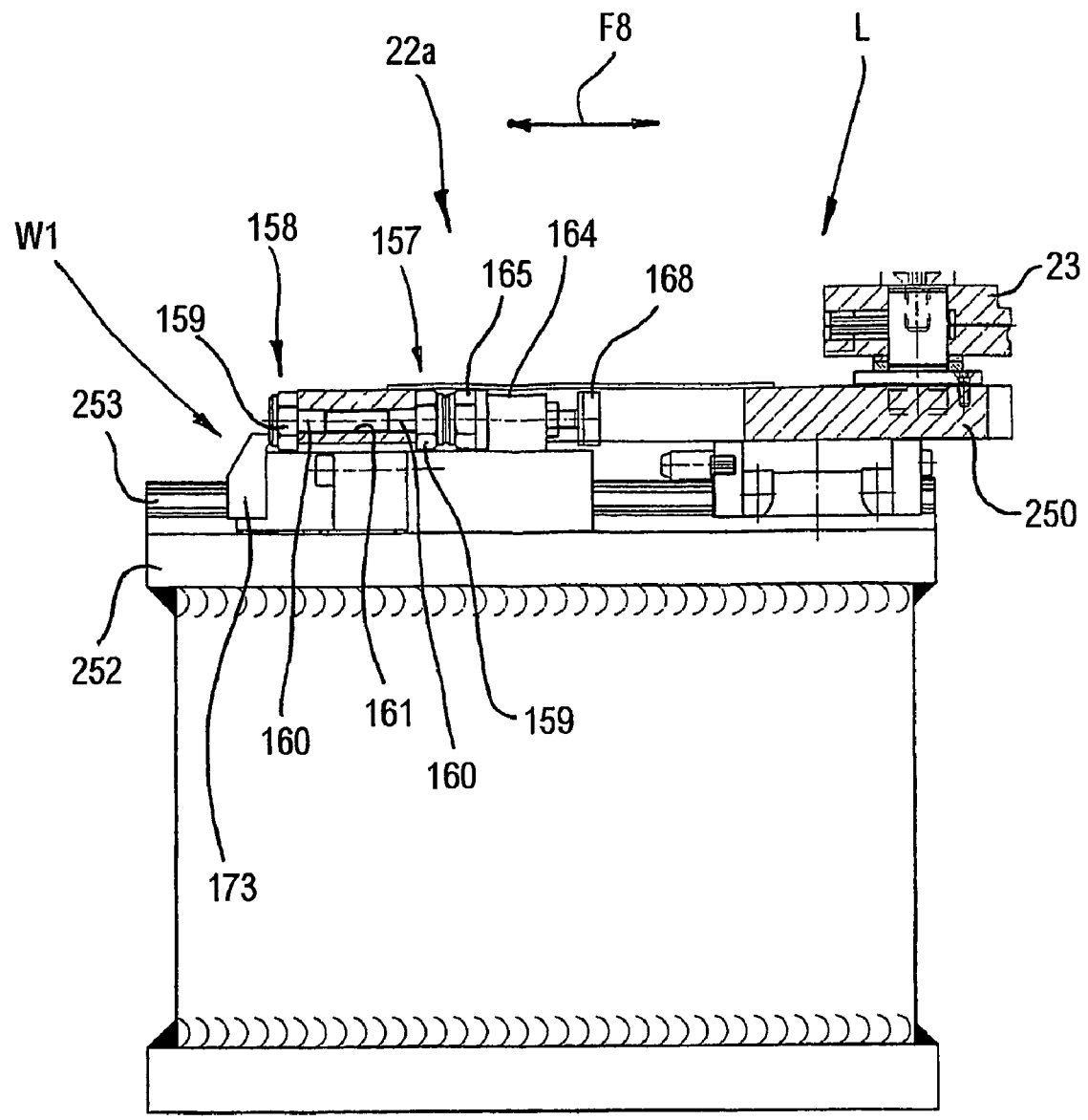
FIG. 8 is a view like the one in FIG. 3, showing the cutting arrangement in a rest configuration.
Figure 9:
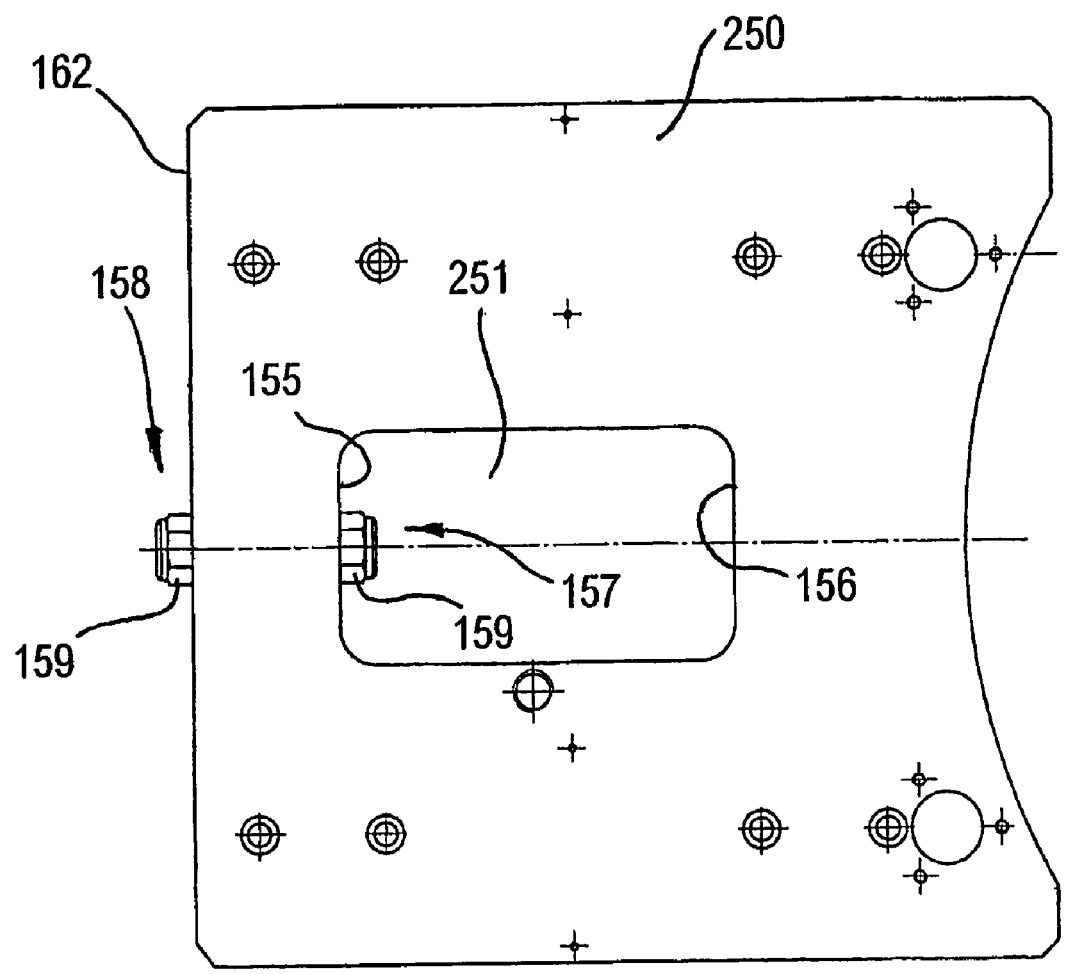
FIG. 9 is a plan view of a support element of the cutting arrangement with which the positioning arrangement shown in FIG. 7 is provided.

FIGS. 7 to 12 show a positioning device 22a made according to one version and comprising a plate 250 arranged to support the etching knife 23 and sliding, as shown by the arrow F8, on a frame 252 of the apparatus 1 between an advanced tool position, indicated by L in FIG. 8, in which a tooth arrangement of the etching knife 23 can interact with the caps, and a retracted rest position, indicated by M in FIG. 7, in which the tooth arrangement of the etching knife 23 is far from a zone of interaction with the caps.

To the plate 250 slidingly coupled runners 254 are fixed in a manner substantially free of play to guides 253 fixed to the frame 252.

The plate 250 is furthermore centrally provided with an opening 251 comprising a first edge zone 155, that is further from the etching knife 23, and from a second edge zone 156, nearer the etching knife 23.

At the first edge zone 155 and at an end face 162 of the plate 250 arranged substantially parallel to the first edge zone 155 there are respectively provided a first abutting element 157 and a second abutting element 158, each one of which comprising the head 159 of a screw the stem 160 of which engages in a threaded hole 161 obtained in the thickness of the plate 250.

The first abutting element 157 is projected from the first edge zone 155 to inside the opening 251, whereas the second abutting element 158 is projected from the end face 162, from the side opposite the first abutting element 157.

The positioning device 22a furthermore comprises a position adjusting arrangement 163 positioned inside the opening 251.

The position adjusting arrangement 163 comprises a block 164 fixed to the frame 252.

At one end 166 of the block 164 nearest to the first edge zone 155 a further abutting element 165 is fixed having an active zone 174 arranged to interact with the first abutting element 157, as will be described in greater detail below.

At a further end 167 of the block 164, opposite the end 166 and therefore nearest the second edge zone 156, a stopping element 168 is fixed.

Between the block 164 and the further abutting element 165 a spacer 169 is interposed.

Similarly to what has been disclosed with reference to the first abutting element 157 and to the second abutting element 158, the further abutting element 165 may comprise a further head 170 of a further screw provided with a further stem received in a further threaded hole obtained in the block 164.

The further abutting element 165 can therefore be easily removed from the block 164 to enable the replacement of the spacer 169 with a further spacer having a different thickness in relation to the thickness of the spacer 169.

In this way the distance of the further stop element 165 from the block 164 can be varied and as a result the position of the etching knife 23 can be adjusted, as will be disclosed in greater detail below.

Figure 10:
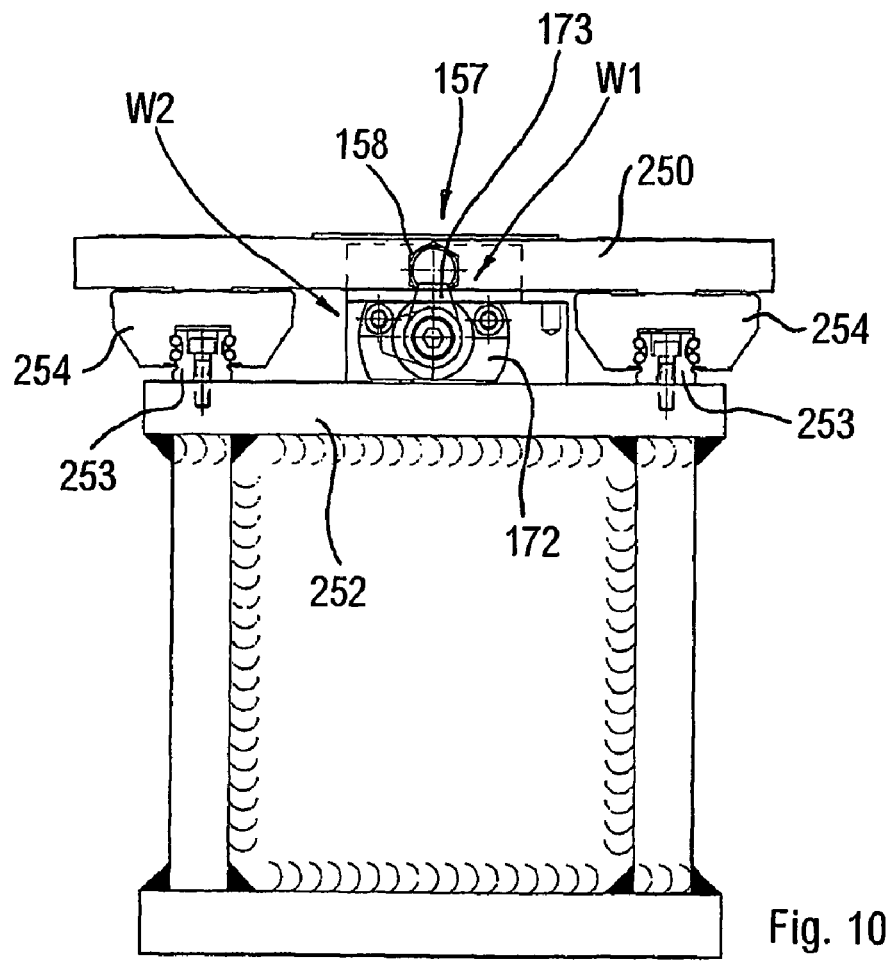
FIG. 10 is a view from behind of the positioning arrangement arranged in a locking configuration, when the cutting arrangement is in the operating configuration shown in FIG. 8.
Figure 11:
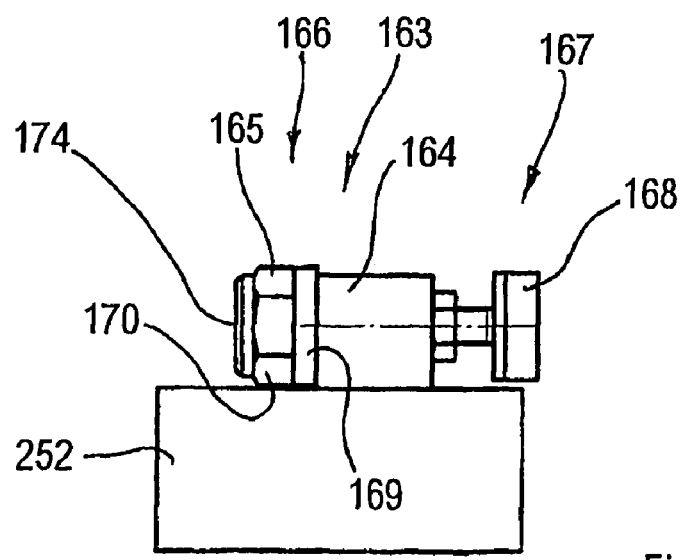
FIG. 11 is a detail of FIG. 7.
Figure 12:
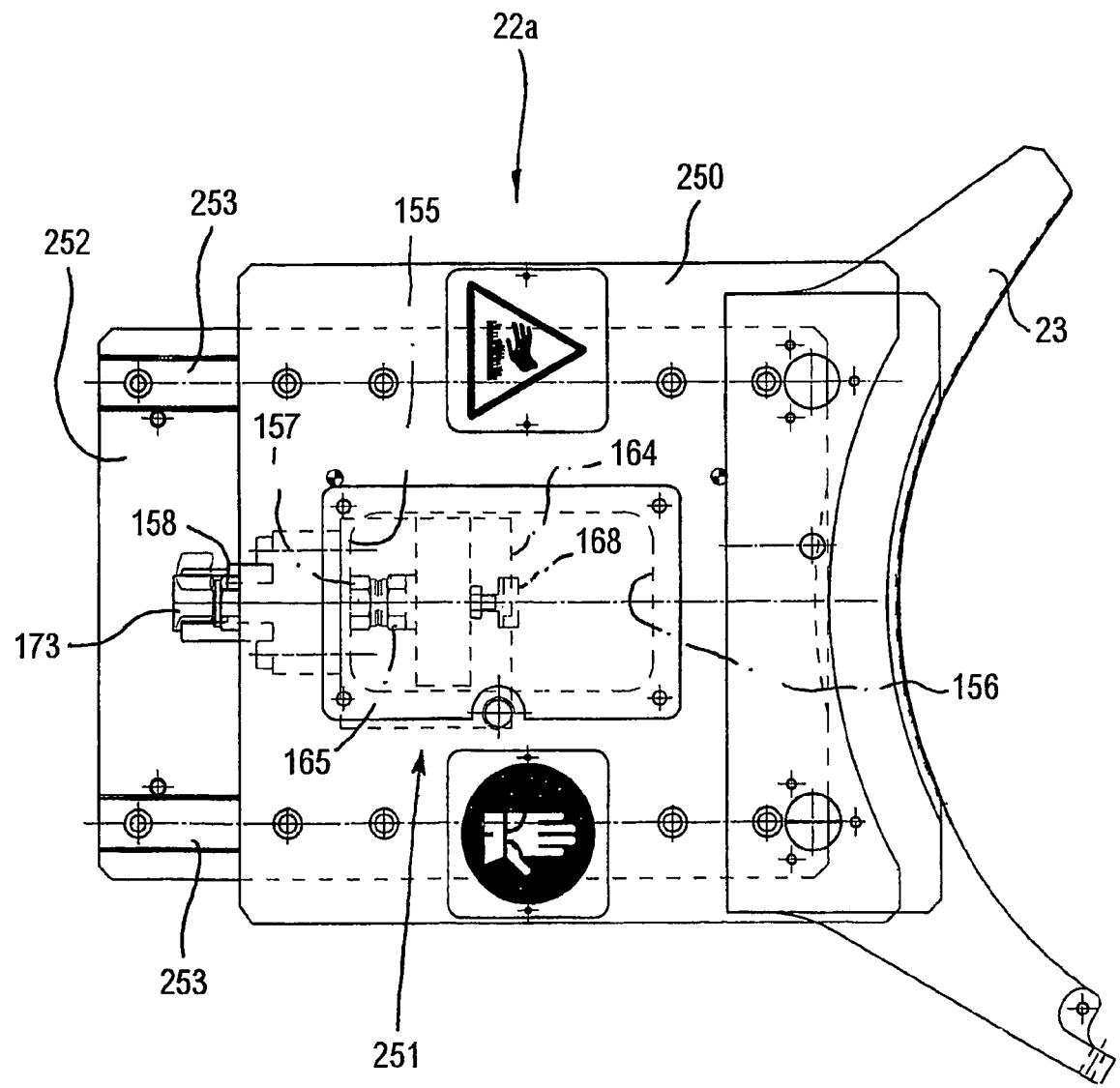
FIG. 12 is a plan view showing the cutting arrangement in the operating configuration in FIG. 8.

The positioning device 22a furthermore comprises a tightening arrangement 171 comprising a tooth 173, rotationally supported on a body 172 that is integral with the frame 252, movable between a locking configuration W1, indicated by a continuous line in FIG. 10, in which the tooth 173 interacts with the second abutting element 158, and a release configuration W2, indicated by a broken line in FIG. 10, in which the tooth 173 does not interact with the second abutting element 158.

Before starting an operating cycle of the apparatus 1, the etching knife can be positioned in the manner disclosed below.

Starting from the retracted rest position M, the plate 250 is made to slide along the guides 253 until the first abutting element 157 makes contact with the further abutting element 165 and the plate 250 is arranged in the advanced work position L.

When the plate 250 is in the retracted rest position M, the tooth 173 takes on the release configuration W2, in such a way as to enable the plate 250 to run along the guides 253.

The plate 250 can be transferred from the retracted rest position M to the advanced work position L by an operator acting manually thereupon.

In this way, the final adjustment operations of the apparatus are extremely rapid.

In addition, as the plate 250 can be moved manually, it is possible to obtain an apparatus that has a moderate cost inasmuch as actuating devices arranged to translate the plate 250 and the etching knife 23 integral therewith do not need to be installed.

When the plate 250 has reached the advanced work position L, the tooth 173 takes on the locking configuration W1 so as to interact with the second abutting element 158 to prevent sliding of the plate 250 along the guides 253.

In this way, during operation of the apparatus 1, the stress transmitted to the etching knife 23 is discharged onto the frame 252 by means of the tooth 173.

When it is necessary to conduct maintenance or replacement operations of the etching knife 23, the tooth 173 is again positioned in the release configuration W2, in which it allows the plate 250 to run along the guides 253 to reach the retracted rest position M, in which the second edge zone 156 is placed in contact with the stopping element 168.

The plate 250 can be taken from the advanced work position L to the retracted rest position M thanks to the manual intervention of an operator, similarly to what has been disclosed above.

When the plate 250 is in the retracted rest position M it is furthermore possible to replace the spacer 169 with a further spacer having a different thickness.

This enables the active zone 174 of the further abutting element 165 to be moved towards to or away from the block 164, in such a way as to regulate the amount of the stroke that the plate 250 accomplishes running along the guides 253 before the first abutting element 157 comes into contact with the active zone 174.

As a result, it is possible to monitor the operating position taken up by the etching knife 23, when the plate 250 with which it is integral is in the advanced work configuration L.

In other words, by replacing the spacer 169 with a further spacer having a suitable thickness, it is possible to obtain an apparatus wherein the distance of the etching knife from the caps to be cut can be adjusted, for example to offset shortening due to wear of the etching knife.

A monitoring device can also be provided that checks the state of wear of the etching knife 23.

Figure 13:
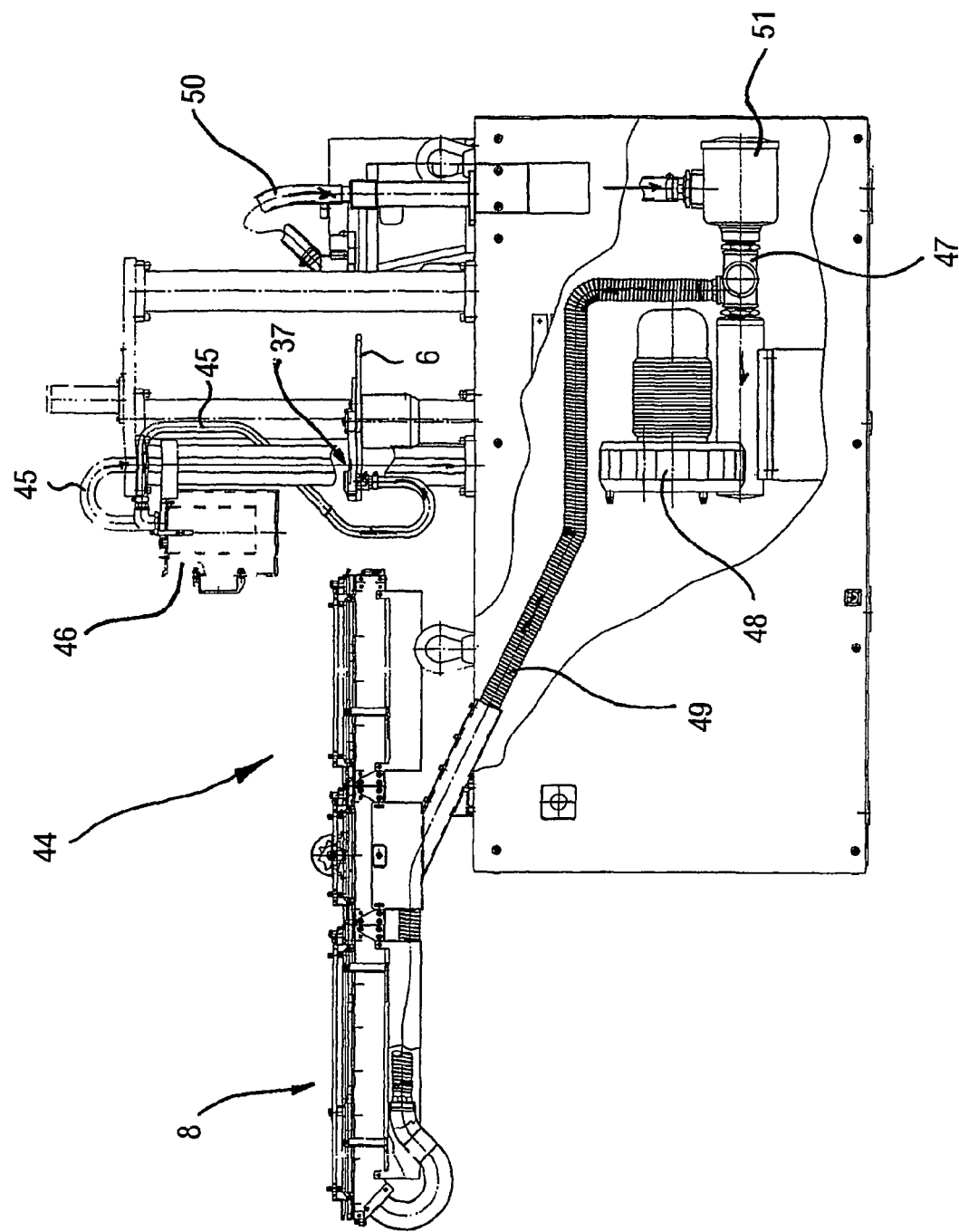
FIG. 13 is a side view of a pressurized air recovery device associated with an apparatus according to the invention.
Figure 14:
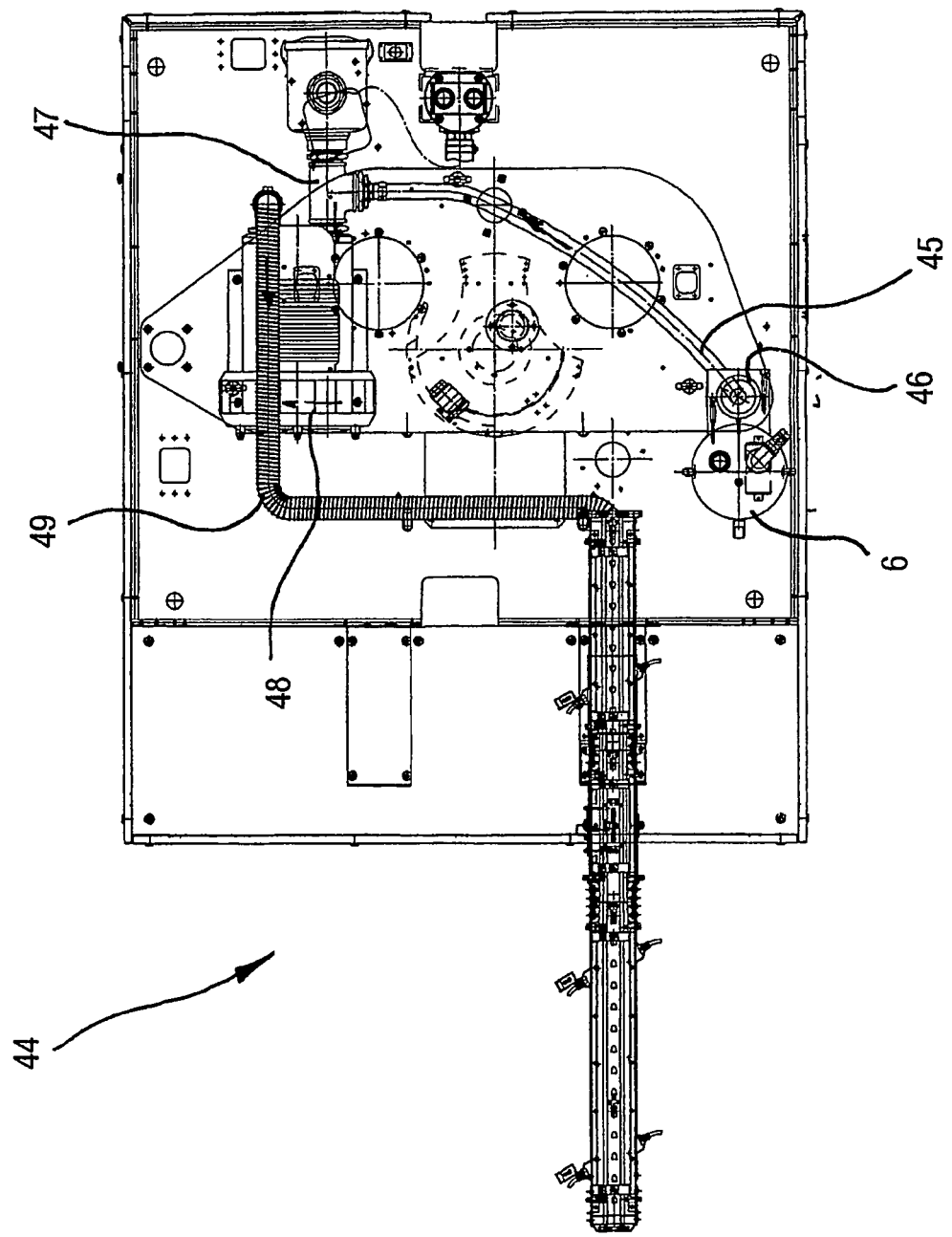
FIG. 14 is a plan view of the device in FIG. 13.

As shown in FIGS. 13 and 14, the apparatus 1 furthermore comprises a pressurized air recovery device 44.

The pressurized air recovery device 44 comprises a conduit 45 connected to a suction device suitable for sucking up the appendages of the casting feedheads that are removed from the caps 2 by means of the cutting device 37 associated with the transferring turntable 6.

The conduit 45 traverses a filter 46 suitable for separating the aforementioned appendages from the air arranged to convey them.

The conduit 45 terminates inside a manifold 47 connected to a fan arranged to direct the air—by a transfer conduit 49—to the pneumatic conveying device 8 that supplies the first operating turntable 3.

The pressurized air recovery device 44 comprises a further conduit 50 connected to further suction device suitable for sucking up flashing produced by the interaction between the cutting arrangement 5 and the caps 2.

The further conduit 50 traverses a further filter 51 suitable for separating the aforementioned flashing from the air arranged to convey it.

The further conduit 50 terminates inside the manifold 47, in such a way that the air brought by the latter, together with the air conveyed by the conduit 45, provides supplying of the fan 48.

The pressurized air recovery device 44 enables energy consumption to be limited due to a pressurized-air generating device inasmuch as air having a pressure greater than atmospheric air is reused rather than being discharged into an external environment.

Figure 15:
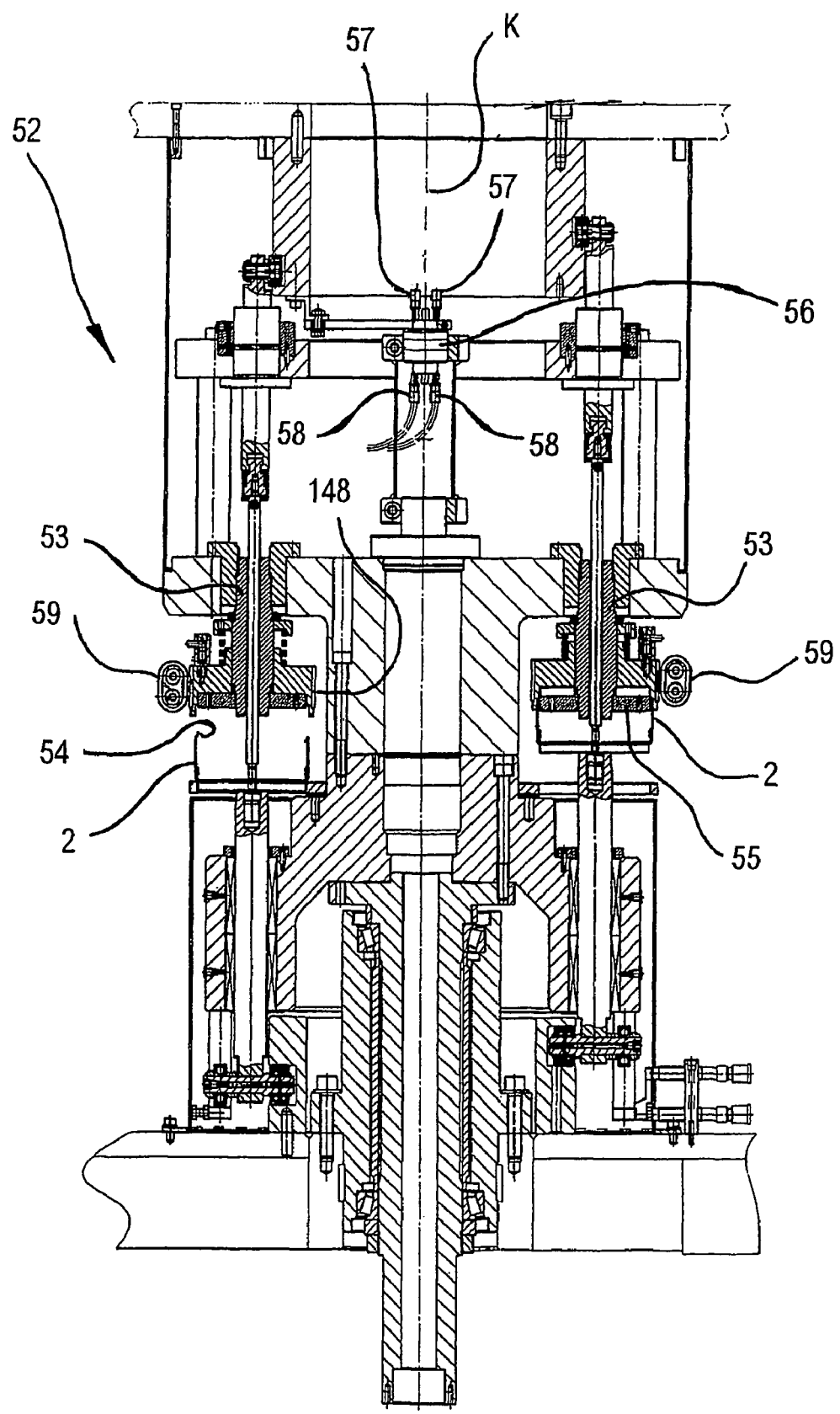
FIG. 15 is a section taken along a transverse plane of a folding arrangement of the apparatus according to the invention.

With reference to FIG. 15, the folding arrangement 52 is shown, which comprises a plurality of collars 148, each fitted on a respective disc body 55 and sliding on a relative spindle 53 such as to fold the flaps 54 of a cap 2 towards the inside of the cap when the latter is shifted upwards.

The apparatus 1 can furthermore be provided with a cutting arrangement—not shown—different from the cutting arrangement 5, shown in FIGS. 4 to 6, and made according to the teachings of International Patent Application WO 99/17911, the contents of which are included here for reference.

In order to provide a folding arrangement in WO 99/17911 it is generally sufficient to fit a collar 148 outside the spindle of the cutting arrangement disclosed in WO 99/17911.

In particular, this cutting arrangement comprises a plurality of jaws having a first end hinged on a respective spindle 53 and a second end with which are associated cutting tools shaped as a circumference arc.

The cutting tools have dimensions such as to define, in a configuration in which they are alongside one another, a complete circumference having a diameter substantially corresponding to the external diameter of the caps 2.

The aforementioned jaws are oscillating, in a direction that is radial in relation to the spindle 53, between a rest position, in which the cutting tools are far from the caps 2, and an operating position, in which the cutting tools tighten on the caps 2 to make a nominal cutting line on the side wall of the latter.

In this case, the cutting arrangement is associated with the relative spindle 53 in such a way as to be coaxially arranged in relation to the folding arrangement 52 and outside them in relation to the spindle 54.

The folding arrangement 52 is rotatable around an axis K and is provided with a rotating electric commutator 56 interposed between first electric terminals 57 and second electric terminals 58 suitable for supplying resistances 59 arranged to heat the collars 148.

In this way, with the apparatus 1 it is possible to very simply hot-fold flaps 54 of caps 2.

Figure 16:
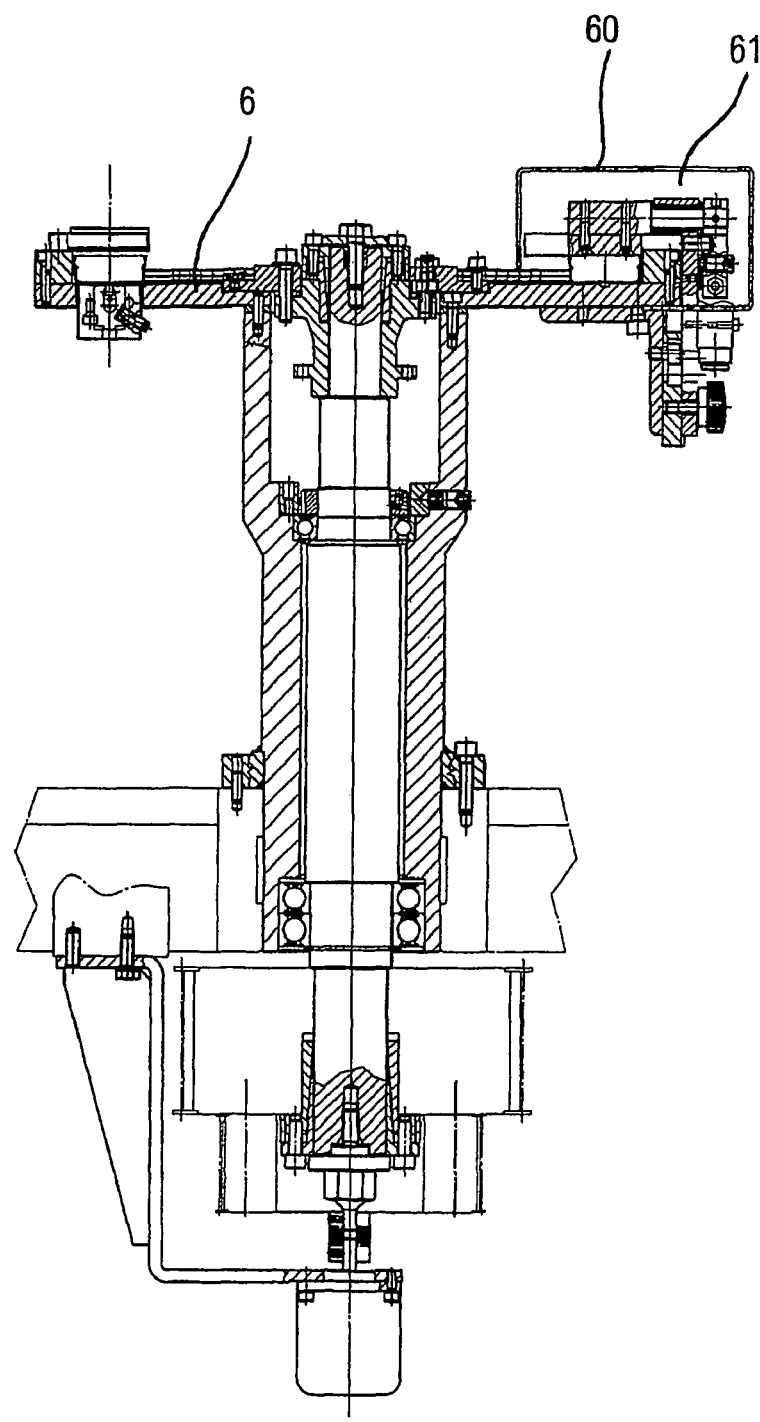
FIG. 16 is a section taken along a transverse plane of one embodiment of the transferring turntable device.

With reference to FIG. 16, a transferring turntable 6 is shown with which a chamber 60 is associated that defines an environment 61, isolated from the exterior, inside which the caps 2 can be subjected to preset treatment, such as refrigeration, or heating or treatment in a controlled atmosphere.

Further treatment may comprise irradiation and/or cleaning operations of the caps 2.

Alternatively, the chamber 60 may be positioned in any zone of the apparatus 1.

In particular, the chamber 60 may be associated with the further transferring turntable 7 rather than with the transferring turntable 6.

Figure 17:
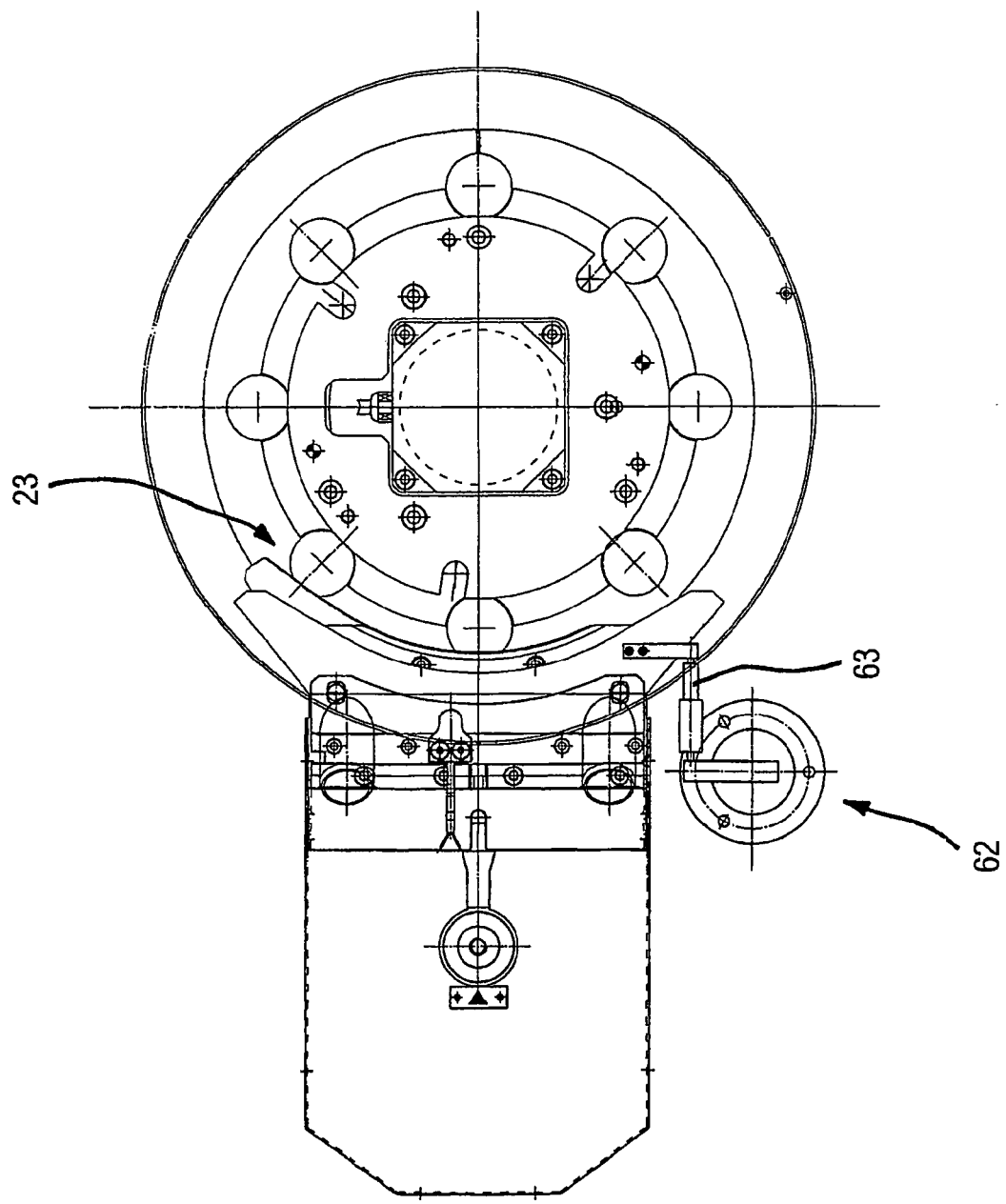
FIG. 17 is a view like the one in FIG. 6 showing a sensing arrangement suitable for detecting the position of the cutting arrangement.

As shown in FIG. 17, the apparatus 1 comprises a sensing arrangement 62 comprising a position sensor 63 that detects any shifting of etching knife 23 due to the heat expansion of the latter.

The position sensor 63 is connected to the positioning device 22 in such a way as to control the micrometric screw 26 to offset the shift of the etching knife 23.

The sensing arrangement 62 may comprise, as an alternative to the position sensor 63, or in addition thereto, a temperature sensor arranged to detect the temperature of the caps 2.

The temperature sensor is connected to the positioning device, in such a way as to adjust the position of the etching knife 23 taking account of the variations of the physical characteristics of the caps 2 according to the temperature of the latter. Physical characteristics that are influenced by temperature are, inter alia, the dimensions, mechanical resistance and the friction coefficient of the caps.

The sensing arrangement 62 may comprise a colour sensing device suitable for detecting the colour of the caps 2.

In the prior art different colours are in fact conferred on plastic material having different properties, such as in particular mechanical resistance.

This is rather important for cutting operations, inasmuch as the cutting arrangement 5 have to act more energetically on the caps 2 if the latter are made of plastic material provided with greater resistance.

The colour sensing device, therefore, after detecting the colour of the caps 2, on each one of which a nominal cutting line must be obtained, correspondingly controls the positioning device 22.

The presence of the sensing arrangement 62 and the interaction thereof with the positioning device 22, enables remote monitoring of the position of the etching knife 23 of the apparatus 1.

With reference to FIGS. 18 to 20, 100 globally indicates an apparatus to fold a fixing promoting arrangement for fixing caps in synthetic material according to the invention, said fixing promoting arrangement being constituted for example by a tamperproof ring.

The apparatus comprises a base that rotationally centrally supports a vertical shaft 102 that actuates a rotating turntable 103. At the top of the vertical shaft 102 a substantially tubular body 104a is supported with interposition of rolling bearings 104 on which a top cover 104b is locked fixed coaxially in relation to the base. The rotating turntable 103 is suitable for conveying the caps 2 in synthetic material, each one of which is provided with a respective tamperproof ring 106, the caps 2 are supplied continuously by a conveying device.

According to the invention, the turntable 103 comprises a plurality of receptacles 107 for respective caps 2, angularly spaced at an equal distance from one another and provided with a substantially uniform peripheral distribution of folding arrangements 108 articulated according to respective radial planes, the intersection of which planes being the axis of symmetry H of the cap 2; the folding arrangements 108 are suitable for rotating from a first substantially retracted angular position outside the perimeter of the tamperproof ring 106 to a second angular position extending in a centripetal direction in relation to the axis H of the cap to fold the tamperproof ring 106 inside the cap.

The rotating turntable 103 is constituted by a bottom drum 109 to which there is connected at the top, for example by screws 110, a support 111 extending with top arms 111a that are angularly spaced at an equal distance from one another. The bottom drum 109 has a thicker part 112 with a plurality of through holes 113 having respective axes parallel to those of the shaft 102 in which respective bushes 114 are housed. Each arm 111a of the support 111 has a through channel 115 made vertically and aligned on a respective through hole 113 of the thicker part 112.

The cover 104b has an external surface grooved by a ring track 116 with a substantially rectangular transverse section and with an appropriate contour.

The apparatus is provided with a plurality of lifting organs 117 suitable for translating the caps 2 axially from a bottom inlet supplying position to an intermediate position in the receptacles 107, in which the caps 2 are taken, with the respective tamperproof rings 106, in peripheral contact along the side surface thereof with the folding arrangements 108 in the first inactive angular position, and from said intermediate position to a top position wherein the folding arrangements 108 are rotated to the second angular position.

The lifting organs 117 comprise, for each of the caps 2 housed between the respective receptacles 107, a bottom plate 118, possibly supported by a respective trunk 118a, to support a respective cap 2 resting on its flat surface; the plate 118 is associated with an actuating device to lift the cap 2 from the bottom position to the intermediate position and from the intermediate position to the top position.

The lifting organs 117 also comprise, for each receptacle 107, a sleeve 119 fixed coaxially inside the respective bush 114, bearing integrally with the bottom end an annular body 120 abutting on a respective diameter 21 narrowing. Along the sleeve 119 a collar 122 is furthermore splined substantially in the middle.

Inside the sleeve 119 a stem 123 is guided slidingly axially that is provided below with a threaded portion along which a foot 124 is threaded that is engageable on the flat surface of the respective cap 2. At the opposite end the stem 123 is connected elastically, through the interposition of a top contrast spring 125 to a pad 126 engaged slidingly in the respective channel 115 of the support 111; the pad 126 is provided laterally with an idle wheel 127 suitable for rolling along the annular track 116 of the cover 104b, such as to determine a preset axial shift of the stem 123 in relation to the angular position of the turntable 103 in relation to the cover 104b.

Along the external surface of the sleeve 119 (see FIGS. 19 and 20), particularly below the collar 122, a moving element 128 is slidingly guided that carries the folding arrangements 108 distributed below of the tamperproof ring 106: the moving element 128 is translatable integrally with the cap 2 by means of the lifting organs 117 from the intermediate position to the top position defined previously.

The annular body 120 has, on the bottom face, a uniform distribution of radially arranged projections 129 angularly spaced at an equal distance from one another and having a curved substantially convex contour; this is furthermore affected by a plurality of cylindrical through seats 130 with respective axes that are parallel to those of the stem 123.

The moving element 128 is constituted by a coupling 131 with which an annular plate 132 is integral at the bottom that is coaxial to the coupling. The coupling is provided with a plurality of peripherally distributed cylindrical seats 133 having two diameters; along the internal surface of the coupling 131 and substantially in the middle an internal ring 134 is obtained provided with holes 135 with respective axes parallel to the axis of the stem 123 and in which are respectively locked partially emerging pegs 136 and which slide in the respective through seats 130.

In the bottom portion 137 with a lesser diameter of each of the cylindrical seats 133 a respective rod 138 is inserted, axially sliding inside a pair of coaxial bushes 139. Each rod 138 has a substantially flat base 140, whereas the top is provided with a head 141 defining a support surface with a circular crown.

In the top portion 142 of each cylindrical seat 133, with a greater diameter, which is threaded for a certain length at the port, a peripheral helical spring 143 is inserted having the bottom edge 143a abutting on the head 141 of the rod 138, and the top end 143b actuated by a disc 144 on which grubscrew 145 acts that is screwed in the seat 133.

A bottom spring 146, for example with wire with a rectangular section, is fitted coaxially along the sleeve 119 and has a first bottom end 146a resting on the internal ring 134 of the coupling 131, whereas the top second end 146b stops on the collar 122 splined along the sleeve 119.

The annular plate 132 has a plurality of openings 147 angularly spaced at an equal distance from one another for the housing of the respective folding arrangements 108; it defines, along its internal surface, a shoulder 148 suitable for stopping the edge of the cap 2.

Figure 21:
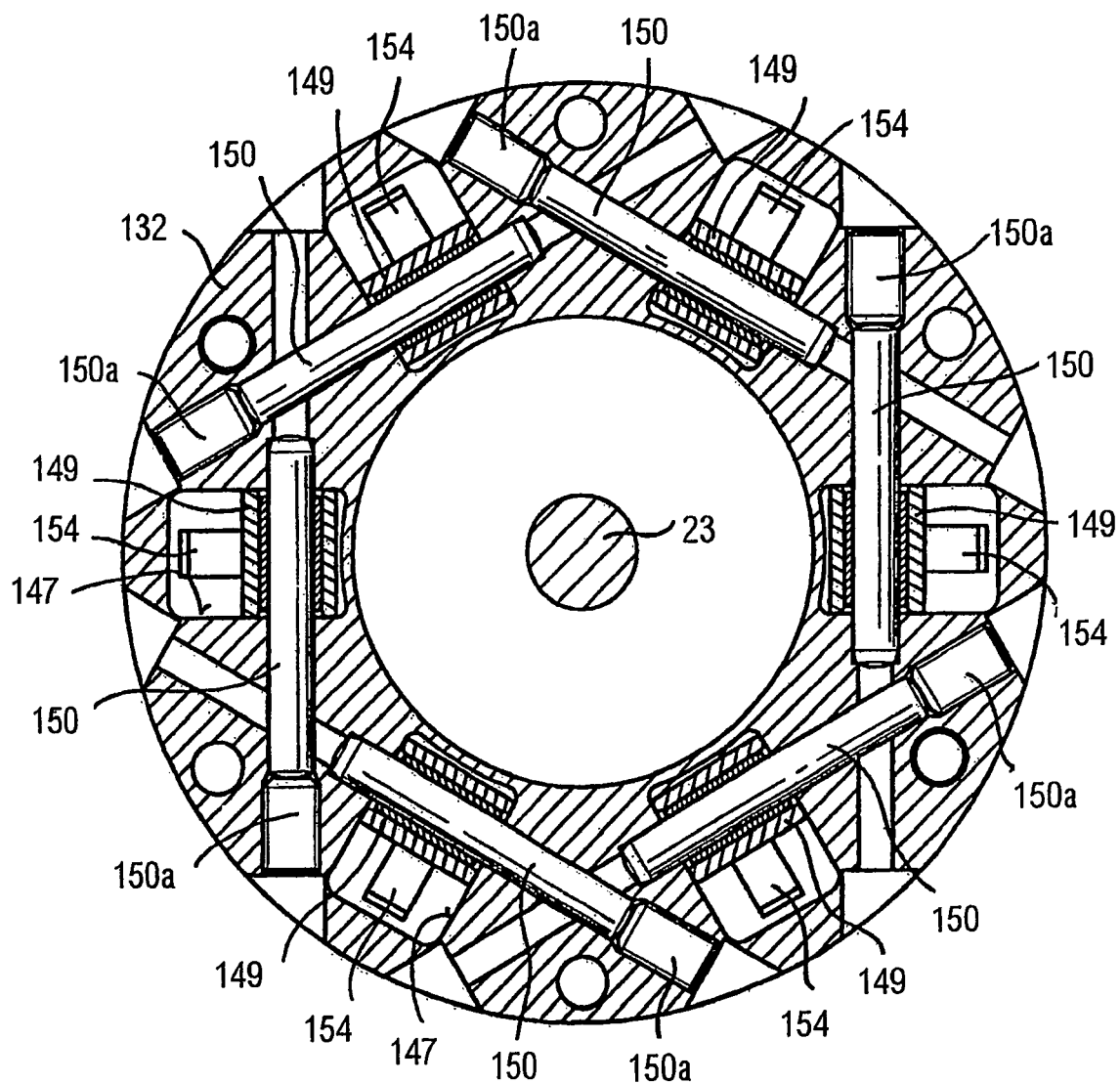
FIG. 21 is a section taken along the plane XXI-XXI in FIG. 19.

According to the invention, the folding arrangements 108 comprise a plurality of rocker arms 149 rotationally supported on respective pivots 150 each one of which is fitted in a respective opening 147 and is locked with horizontal grubscrews 150a with axes arranged in directions substantially tangential to the cap 2 (FIG. 21).

Each of the rocker arms 149 has a free contact end 151 with the external side surface of the tamperproof ring 106, end provided with a roller 152 suitable for rolling along the respective projection 129 of the annular body 120, so that to the first inactive angular position of the rocker arm 149 a roller 152 position corresponds that is substantially peripheral to the annular body itself, whereas to the second angular position a roller position of the roller 152 corresponds that is substantially central and extended inside the cap 2 to fold the tamperproof ring 106 inside.

The free end 151 of each rocker arm 149 is substantially shaped as a fork with the respective prongs 153 suitable for rotationally supporting the roller 152. The transverse distance between the prongs 153 is substantially greater than the greater thickness of the respective projection 129 of the annular body 120, to enable rotation of the rocker arm 149 without interference.

Each rocker arm 149 also has an end portion 154 opposite the respective free end 151, with concave surface, engaged against the base 140 of the respective rod 138. The rod 138, through the action of the peripheral spring 143, thus enables, with the cap 2 and the coupling 132 in the intermediate position the roller 152 to be placed in the peripheral position of the annular body 120; the coupling of the flat base 140 of the rod 138 with the concave surface of the terminal portion 154 ensures that the rod 138 is subjected to prevalently axial stress.

The operation of the apparatus according to the invention is as follows.

The continuously supplied caps 2 are each deposited on a respective plate 118 lying on the respective flat surface in the bottom position of the lifting organs 117. Each stem 123, actuated by rolling of the respective wheel 127 in the track 116 is made to descend until the foot 124 comes to engage in the flat surface of the cap 2.

Each cap 2, locked between the respective plate 118 and the foot 124, is then lifted from the bottom position until it reaches the intermediate position (FIG. 19), where it is inserted in the respective receptacle 107 with the edge stopping on the shoulder 148 of the annular plate 132. The presence of the top spring 125 associated with the stem 123 enables compensation of even slight dimensional differences between the different caps 2, due to manufacturing imperfections.

The cap 2 continues its ascent stroke (which occurs constantly without interruptions), reaching the top position (FIG. 20), thereby also determining the corresponding upward transfer of the moving element 128. In particular, the coupling 131 together with the annular plate 132 perform a vertical stroke, elastically opposed by the bottom spring 146: this upward stroke causes each roller 152 to roll along the respective projection 129 in a direction that is centripetal from the peripheral position to the central position. In this way, each roller 152 exerts centripetal pressure on the external lateral surface of the tamperproof ring 106, folding it inside the cap 2.

At the same time the terminal portion 154 of each rocker arm 149, following the rotation of the latter from the first inactive angular position to the second angular position, transmits a force that is substantially axial to the relative rod 138: the rod 138 thus transfers upwards, compressing the peripheral spring 143.

After the tamperproof ring 106 has been folded, the cap 2 is lowered until it again reaches the bottom position, thanks to the simultaneous downwards transfer of the stem 123 (that facilitates expulsion of the cap 2 from the receptacle 107) and of the plate 118. To this shift also corresponds the descent of the moving element 128 to the corresponding initial position (corresponding to the intermediate position of the cap 2), caused by the bottom spring 146; there is also the axial downward transfer of the rods 138, caused by the peripheral springs 143 with the rocker arms 149 that correspondingly rotate, thereby reaching the first angular position.

The apparatus according to the invention enables the tamperproof ring 106 to be folded by folding arrangements 108 that act in directions that are substantially radial in relation to the axis of the cap 2, thereby preventing the cap from being subjected to excessive stress that is a frequent cause of undesired plastic deformation.

Moreover, the apparatus is highly versatile and can easily be set up and adapted to the changing shapes and dimensions of the caps.

The invention claimed is:

1. Device for positioning a tool in relation to an object to be processed, the device comprising:
a toolholder element suitable for bearing said tool and movable along a registration direction in which said tool is moved towards and away from said object;
an adjustable member movable in a sliding direction transversely of said registration direction so as to be operationally associatable with said toolholder element; and
an abutting member suitable for tightening said toolholder element against said adjustable member, said toolholder element being interposed between said abutting member and said adjustable member along said registration direction;
wherein said adjustable member comprises a block actuated to slide in said sliding direction by an adjusting arrangement and provided with a tilted face suitable for interacting with a correspondingly tilted active surface of said toolholder element, said face and active surface being tilted in relation to a vertical plane; and
wherein said abutting member translates said toolholder element in said registration direction which is transverse in relation to said sliding direction.

2. Device according to claim 1, wherein said abutting member comprises a further tilted face suitable for interacting with a further correspondingly tilted active surface, opposite said active surface, of said toolholder element, said further face and further active surface being tilted in relation to a vertical plane.

3. Device according to claim 1, wherein said adjusting arrangement comprises a micrometric screw member rotatingly coupled with said block.

4. Device according to claim 1, comprising a frame arrangement, and wherein said block comprises an abutting surface sliding on said frame arrangement.

5. Device according to claim 1, comprising a frame arrangement, and wherein said abutting member comprises a further abutting surface sliding on said frame arrangement.

6. Device according to claim 1, and furthermore comprising an actuating device arranged to transfer said abutting member between a work position, wherein said abutting member interacts with said toolholder element, and a rest position, wherein said abutting member does not interact with said toolholder element.

7. Device according to claim 6, and furthermore comprising a further actuating device arranged to move said toolholder element, when said abutting member is in said rest position.

8. Device according to claim 1, wherein said tool comprises an etching knife of an apparatus for the production of caps.

* * * * *